US011003247B1

(12) United States Patent
Sinclair et al.

(10) Patent No.: US 11,003,247 B1
(45) Date of Patent: May 11, 2021

(54) DEPLOYABLE CONTROLLER

(71) Applicant: Microsoft Technology Licensing, LLC, Redmond, WA (US)

(72) Inventors: Michael Jack Sinclair, Kirkland, WA (US); Robert Kovacs, Berlin (DE); Eyal Ofek, Redmond, WA (US); Mar Gonzalez Franco, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/824,995

(22) Filed: Mar. 20, 2020

(51) Int. Cl.
*G06F 3/01* (2006.01)
*G02B 27/01* (2006.01)
*G06T 19/00* (2011.01)

(52) U.S. Cl.
CPC ......... *G06F 3/014* (2013.01); *G02B 27/0172* (2013.01); *G06F 3/016* (2013.01); *G06F 3/017* (2013.01); *G06T 19/006* (2013.01)

(58) Field of Classification Search
CPC ........... G06F 3/014; G06F 3/016; G06F 3/017
USPC ....................................................... 345/156
See application file for complete search history.

(56) References Cited

U.S. PATENT DOCUMENTS

| | | | | |
|---|---|---|---|---|
| 4,531,080 A * | 7/1985 | Nordstrom | ............. | G05G 9/047 318/628 |
| 4,895,039 A * | 1/1990 | Hegg | ....................... | G05G 1/58 74/471 XY |
| 5,514,861 A * | 5/1996 | Swartz | .................... | G06F 1/163 235/462.44 |
| 9,516,907 B2 * | 12/2016 | Guidry | ............... | A41D 19/0024 |
| D780,807 S | 3/2017 | Chen et al. | | |
| 9,898,091 B2 | 2/2018 | Bristol et al. | | |
| D827,638 S * | 9/2018 | Tamillow | ..................... | D14/344 |
| 10,391,400 B1 | 8/2019 | Mucha et al. | | |
| 2003/0122775 A1* | 7/2003 | Ti | ............................ | G06F 1/169 345/156 |
| 2010/0176166 A1* | 7/2010 | Siagri | ................... | A44C 5/0007 224/271 |
| 2010/0201625 A1* | 8/2010 | Urbach | .................. | G06F 3/0338 345/163 |
| 2011/0245858 A1* | 10/2011 | Milsom | .............. | A61B 1/00135 606/191 |

(Continued)

OTHER PUBLICATIONS

Zenner, et al., "Drag:on: A Virtual Reality Controller Providing Haptic Feedback Based on Drag and Weight Shift", In Proceedings of the CHI Conference on Human Factors in Computing Systems, May 4, 2019, 12 Pages.

(Continued)

*Primary Examiner* — Albert K Wong
(74) *Attorney, Agent, or Firm* — Rainier Patents, P.S.

(57) ABSTRACT

The present concepts relate to devices that can employ deployable controllers. In one example the device can include a base assembly configured to ground the device to a non-hand body part of a user. The example can also include an engagement assembly configured to receive tactile input from a hand of the user or to deliver tactile output to the hand of the user. The device can further include a deployment assembly extending from the base assembly to the engagement assembly and configured to deploy the engagement assembly from a storage orientation proximate to the base assembly to a deployed orientation proximate to the hand of the user.

20 Claims, 19 Drawing Sheets

(56) References Cited

U.S. PATENT DOCUMENTS

| | | | |
|---|---|---|---|
| 2014/0176439 A1* | 6/2014 | Keller | G06F 3/0233 345/159 |
| 2016/0274662 A1 | 9/2016 | Rimon et al. | |
| 2016/0349790 A1* | 12/2016 | Connor | G06F 1/163 |
| 2017/0139481 A1 | 5/2017 | Long | |
| 2017/0329515 A1* | 11/2017 | Clement | G06F 3/011 |
| 2018/0058128 A1* | 3/2018 | Khan | E05F 15/611 |
| 2018/0150131 A1* | 5/2018 | Ranieri | G06F 3/017 |
| 2019/0279593 A1* | 9/2019 | Heinze | G06F 3/0416 |
| 2019/0324538 A1 | 10/2019 | Rihn et al. | |
| 2020/0155342 A1* | 5/2020 | Schultz | A61F 7/007 |
| 2020/0376370 A1* | 12/2020 | Ham | G06F 3/011 |
| 2020/0390510 A1* | 12/2020 | Thompson | A61B 34/35 |

OTHER PUBLICATIONS

Zenner, et al., "Shifty: A Weight-Shifting Dynamic Passive Haptic Proxy to Enhance Object Perception in Virtual Reality", In Journal of IEEE Transactions on Visualization and Computer Graphics, vol. 23, Issue 4, Apr. 2017, pp. 1312-1321.

Zhao, et al., "Enabling People with Visual Impairments to Navigate Virtual Reality with a Haptic and Auditory Cane Simulation", In Proceedings of the CHI Conference on Human Factors in Computing Systems, Apr. 21, 2018, 14 Pages.

Zubrycki, et al., "Novel Haptic Device Using Jamming Principle for Providing Kinaesthetic Feedback in Glove-Based Control Interface", In Journal of Intelligent and Robotic Systems, vol. 85, Issue 3-4, Jun. 15, 2016, pp. 413-429.

"CyberGrasp", Retrieved from: https://web.archive.org/web/20190906213548/http:/www.cyberglovesystems.com/cybergrasp/, Sep. 6, 2019, 4 Pages.

"DayDream", Retrieved from: https://web.archive.org/web/20191105125945/https:/arvr.google.com/daydream/, Nov. 5, 2019, 5 Pages.

"Haptx", Retrieved from: https://web.archive.org/web/20190926150323/https:/haptx.com/, Sep. 26, 2019, 10 Pages.

"HTC Vive Cosmos Hands-On", Retrieved from: https://www.gsmarena.com/htc_vive_cosmos_handson-news-39591.php, Oct. 13, 2019, 6 Pages.

"Need a Hand? The Mind Controlled Robot Fingers you can Strap on to do Everything from Hold a Pad to Help Lift Heavy Objects", Retrieved from: https://www.dailymail.co.uk/sciencetech/article-3601634/Need-hand-Mind-controlled-robot-arm-strapped-add-extra-fingers.html, May 20, 2016, 22 Pages.

"Novint's* Falcon Haptic Device", Retrieved from: https://web.archive.org/web/20160406210624/https:/hapticshouse.com/pages/novints-falcon-haptic-device, Apr. 6, 2016, 3 Pages.

"Pimax Announces the Sword and Sword Sense VR 2.0 Controllers", Retrieved from: https://www.pimax.com/blogs/milestone/the-sword-and-sword-sense-vr-2-0-controllers, May 1, 2019, 4 Pages.

"Plexus", Retrieved from: https://web.archive.org/web/20190512183432/http:/plexus.im/, May 12, 2019, 3 Pages.

"The Next Level of VR Gaming", Retrieved from: https://web.archive.org/web/20190811065237/https:/www.oculus.com/quest/features/?locale=en_US, Aug. 11, 2019, 3 Pages.

"VIVE", Retrieved from: https://web.archive.org/web/20191105092859/https:/www.vive.com/us/, Nov. 5, 2019, 3 Pages.

Amemiya, et al., "Asymmetric Oscillation Distorts the Perceived Heaviness of Handheld Objects", In Journal of IEEE Transactions on Haptics, vol. 1, Issue 1, Jan. 2008, pp. 9-18.

Araujo, et al., "Snake Charmer: Physically Enabling Virtual Objects", In Proceedings of the 10th International Conference on Tangible, Embedded, and Embodied Interaction, Feb. 14, 2016, pp. 218-226.

Benko, et al., "NormalTouch and TextureTouch: High-Fidelity 3D Haptic Shape Rendering on Handheld Virtual Reality Controllers", In Proceedings of the 29th Annual Symposium on User Interface Software and Technology, Oct. 16, 2016, pp. 717-728.

Berger, et al., "Expanding the Sense of Touch Outside the Body", In Proceedings of the 15th ACM Symposium on Applied Perception, Aug. 10, 2018, 9 Pages.

Berger, et al., "The Uncanny Valley of Haptics", In Journal of Science Robotics, vol. 3, Issue 17, Apr. 18, 2018, 13 Pages.

Bouzit, et al., "The Rutgers Master II-ND Force Feedback Glove", In Proceedings 10th Symposium on Haptic Interfaces for Virtual Environment and Teleoperator Systems, Mar. 24, 2002, 8 Pages.

Choi, et al., "CLAW: A Multifunctional Handheld Haptic Controller for Grasping, Touching, and Triggering in Virtual Reality", In Proceedings of the CHI Conference on Human Factors in Computing Systems, Apr. 21, 2018, 13 Pages.

Choi, et al., "Wolverine: A Wearable Haptic Interface for Grasping in Virtual Reality", In Proceedings of IEEE/RSJ International Conference on Intelligent Robots and Systems, Oct. 9, 2016, 8 Pages.

Cutkosky, Mark R., "On Grasp Choice, Grasp Models, and the Design of Hands for Manufacturing Tasks", In IEEE Transactions on Robotics and Automation, vol. 5, No. 3, Jun. 1989, pp. 269-279.

Endo, et al., "Five-Fingered Haptic Interface Robot: HIRO III", In Journal of IEEE Transactions on Haptics, vol. 4, Issue 1, Jan. 2011, pp. 14-27.

Franco, Mar Gonzalez, "Neurophysiological Signatures of the Body Representation in the Brain using Immersive Virtual Reality", In Thesis Submitted to the Doctorate Program in Clinical Psychology, Dec. 2014, 195 Pages.

Gabardi, et al., "A New Wearable Fingertip Haptic Interface for the Rendering of Virtual Shapes and Surface Features", In Proceedings of IEEE Haptics Symposium, Apr. 8, 2016, pp. 140-146.

Gonzalez-Franco, et al., "Avatar Embodiment Enhances Haptic Confidence on the Out-of-Body Touch Illusion", In Journal of IEEE Transactions on Haptics, vol. 12, Issue 3, Jul. 2019, pp. 319-326.

Gonzalez-Franco, et al., "Model of Illusions and Virtual Reality", In Journal of Frontiers in Psychology, Jun. 30, 2017, 8 Pages.

Grosse-Puppendahl, et al., "Finding Common Ground: A Survey of Capacitive Sensing in Human-Computer Interaction", In Proceedings of the CHI Conference on Human Factors in Computing Systems, May 6, 2017, pp. 3293-3316.

Gu, et al., "Dexmo: An Inexpensive and Lightweight Mechanical Exoskeleton for Motion Capture and Force Feedback in VR", In Proceedings of the CHI Conference on Human Factors in Computing System, May 7, 2016, pp. 1991-1995.

Gustafson, et al., "Imaginary Phone: Learning Imaginary Interfaces by Transferring Spatial Memory from a Familiar Device", In Proceedings of the 24th Annual ACM Symposium on User Interface Software and Technology, Oct. 16, 2011, pp. 283-292.

Haggard, et al., "Voluntary Action and Conscious Awareness", In Journal of Nature Neuroscience, vol. 5, Issue 4, Apr. 2002, pp. 382-385.

Heo, et al., "Thor's Hammer: An Ungrounded Force Feedback Device Utilizing Propeller-Induced Propulsive Force", In Proceedings of the CHI Conference on Human Factors in Computing Systems, Apr. 21, 2018, 11 Pages.

Hinchet, et al., "DextrES: Wearable Haptic Feedback for Grasping in VR via a Thin Form-Factor Electrostatic Brake", In Proceedings of the 31st Annual ACM Symposium on User Interface Software and Technology, Oct. 14, 2018, pp. 901-912.

Hinckley, et al., "Pre-Touch Sensing for Mobile Interaction", In Proceedings of the CHI Conference on Human Factors in Computing Systems, May 7, 2016, pp. 2869-2881.

Khurshid, et al., "Effects of Grip-Force, Contact, and Acceleration Feedback on a Teleoperated Pick-and-Place Task", In Journal of IEEE Transactions on Haptics, vol. 10, Issue 1, Jan. 2017, pp. 40-53.

Kim, et al., "Encountered-Type Haptic Display for Large VR Environment using Per-Plane Reachability Maps", In Publication of John Wiley & Sons, Inc, May 2, 2018, 11 Pages.

Lee, et al., "TORC: A Virtual Reality Controller for In-Hand High-Dexterity Finger Interaction", In Proceedings of CHI Conference on Human Factors in Computing Systems, May 4, 2019, 13 Pages.

Massie, et al., "The Phantom Haptic Interface: A Device for Probing Virtual Objects", In Proceedings of the ASME Winter Annual

(56) References Cited

OTHER PUBLICATIONS

Meeting, Symposium on Haptic Interfaces for Virtual Environment and Teleoperator Systems, Nov. 6, 1994, 6 Pages.

Minamizawa, et al., "Gravity Grabber: Wearable Haptic Display to Present Virtual Mass Sensation", In ACM SIGGRAPH Emerging Technologies, Aug. 5, 2007, 4 Pages.

Murayama, et al., "SPIDAR G&G: A Two-Handed Haptic Interface for Bimanual VR Interaction", In Proceedings of EuroHaptics, Jun. 5, 2004, pp. 138-146.

Murer, et al., "Torquescreen: Actuated Flywheels for Ungrounded Kinesthetic Feedback in Handheld Devices", In Proceedings of 9th International Conference on Tangible, Embedded, and Embodied Interaction, Jan. 15, 2015, pp. 161-164.

Padrao, et al., "Violating Body Movement Semantics: Neural Signatures of Self-Generated and External-Generated Errors", In Journal of Neuroimage, vol. 124, Jan. 1, 2016, 33 Pages.

Papp, Donald, "Revealed: Homebrew Controller Working in Steam VR", Retrieved from: https://hackaday.com/2016/12/16/revealed-homebrew-controller-working-in-steam-vr/, Dec. 16, 2016, 8 Pages.

Prattichizzo, et al., "Towards Wearability in Fingertip Haptics: A 3-DoF Wearable Device for Cutaneous Force Feedback", In Journal of IEEE Transactions on Haptics, vol. 6, Issue 4, Oct. 2013, pp. 506-516.

Shigeyama, et al., "Transcalibur: A Weight Shifting Virtual Reality Controller for 2D Shape Rendering Based on Computational Perception Model", In Proceedings of the CHI Conference on Human Factors in Computing Systems, May 4, 2019, 11 Pages.

Shimojo, Shinsuke, "Postdiction: Its Implications on Visual Awareness, Hindsight, and Sense of Agency", In Journal of Frontiers in Psychology, vol. 5, Article 196, Mar. 31, 2014, 19 Pages.

Simon, et al., "Wearable Jamming Mitten for Virtual Environment Haptics", In Proceedings of the ACM International Symposium on Wearable Computers, Sep. 13, 2014, pp. 67-70.

Sinclair, et al., "CapstanCrunch: A Haptic VR Controller with User-Supplied Force Feedback", In Proceedings of the 32nd Annual ACM Symposium on User Interface Software and Technology, Oct. 20, 2019, pp. 815-829.

Sinclair, et al., "TouchMover: Actuated 3D Touchscreen with Haptic Feedback", In Proceedings of the ACM International Conference on Interactive Tabletops and Surfaces, Oct. 6, 2013, pp. 287-296.

Strasnick, et al., "Haptic Links: Bimanual Haptics for Virtual Reality Using Variable Stiffness Actuation", In Proceedings of the CHI Conference on Human Factors in Computing Systems, Apr. 21, 2018, 12 Pages.

Swindells, et al., "TorqueBAR: An Ungrounded Haptic Feedback Device", In Proceedings of the 5th International Conference on Multimodal Interfaces, Nov. 5, 2003, pp. 52-59.

Walker, et al., "Haptic Orientation Guidance Using Two Parallel Double-Gimbal Control Moment Gyroscopes", In Journal of IEEE Transactions on Haptics, vol. 11, No. 2, Apr. 2018, pp. 267-278.

Whitmire, et al., "Haptic Revolver: Touch, Shear, Texture, and Shape Rendering on a Reconfigurable Virtual Reality Controller", In Proceedings of the CHI Conference on Human Factors in Computing Systems, Apr. 21, 2018, 12 Pages.

\* cited by examiner

VISUALIZATION 700

VISUALIZATION 900
902
906
REPRESENTATION 904

DEVICE 110
ENGAGEMENT ASSEMBLY 116

VISUALIZATION 908
902
REPRESENTATION 904

DEVICE 110
910
ENGAGEMENT ASSEMBLY 116

VISUALIZATION 1000

DEPLOYABLE CONTROLLER

BACKGROUND

In real life, humans tend to use their hands to interact with objects. They tend to reach out for such objects, touch, grasp, manipulate, and release them. In augmented reality (AR) and/or virtual reality (VR) however, such fine-grained interaction with virtual objects is generally not possible today. For instance, AR/VR headsets may track user hand positions, but cannot provide haptic feedback to his/her hands.

Hand-held controllers have been developed for AR and VR scenarios to mimic real world interactions (e.g., to provide positional information for the user's hand and/or to provide haptic feedback). Hand-held controllers exist in a variety of shapes and can perform a range of functions. While most of them track three-dimensional (3D) motion, simple controllers are designed merely for movement and button-based input. More advanced controllers can include complex controls and provide output to the user. While most commercial devices provide only vibrotactile feedback, researchers have demonstrated a wide variety of hand-held controllers rendering texture, shape, grasp and squeeze feedback, shifting weight, and haptic behavior for two-handed use. While the capabilities of these controllers can vary, an unfortunate commonality is that the user has to basically hold them all the time or interrupt the AR/VR experience to put them down when not needed and pick them up when needed.

Thus, one problem with hand-held controllers is that the user must grasp them constantly, thereby impeding the natural use of other objects in the physical world. Particularly in VR, where a virtual environment substitutes one's view of the real world, users must often employ controllers for all virtual interactions. When the real world intrudes, it is slow and cumbersome to repeatedly pick up and put down controllers.

Another set of popular controllers includes glove-type controllers, but since these are worn, the user cannot easily disengage from the controller. Glove-type controllers typically render dexterous feedback, including pressure and vibration to the user's fingertips. However, glove-type controllers still constrain motion and hinder dexterity to use real-world tools or to quickly switch to traditional input devices, like a keyboard. The present concepts can address any of these and/or other issues.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. In some cases, parentheticals are utilized after a reference number to distinguish like elements. Use of the reference number without the associated parenthetical is generic to the element. The accompanying drawings are not necessarily drawn to scale. In the figures, the left-most digit of a reference number identifies the figure in which the reference number first appears. The use of similar reference numbers in different instances in the description and the figures may indicate similar or identical items.

DETAILED DESCRIPTION

The present concepts relate to devices that include deployable controllers that can be employed by a user in various scenarios including AR and VR scenarios, among others. The deployable controller can allow the user to tactilely engage virtual objects with their hand(s). The device can be secured to a body part of the user beside the hand, such as a forearm. The deployable controller can be deployed from a storage or stowed orientation to an engagement orientation when engagement is desired and returned when engagement ceases. Securing the device to the forearm can allow the deployable controller to be grounded to impart forces that cannot be imparted with a strictly hand-held controller. Further, storing the deployable controller can allow the user to use his/her hands in a normal unencumbered manner when the deployable controller is not being used.

Figure 1A:
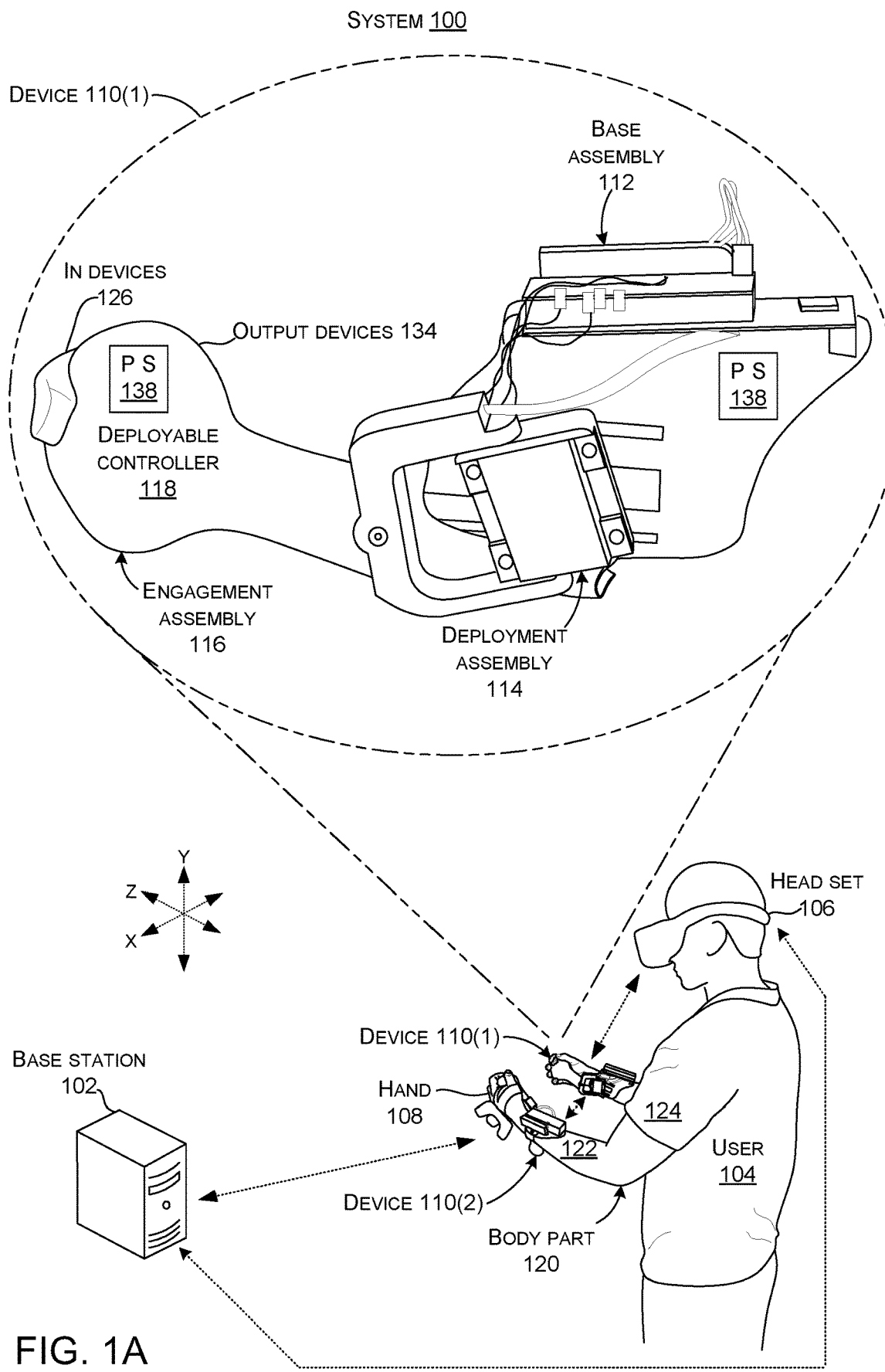
FIGS. 1A and 12 illustrate example systems in which deployable controller concepts can be employed, consistent with some implementations of the present concepts.
Figure 1B:
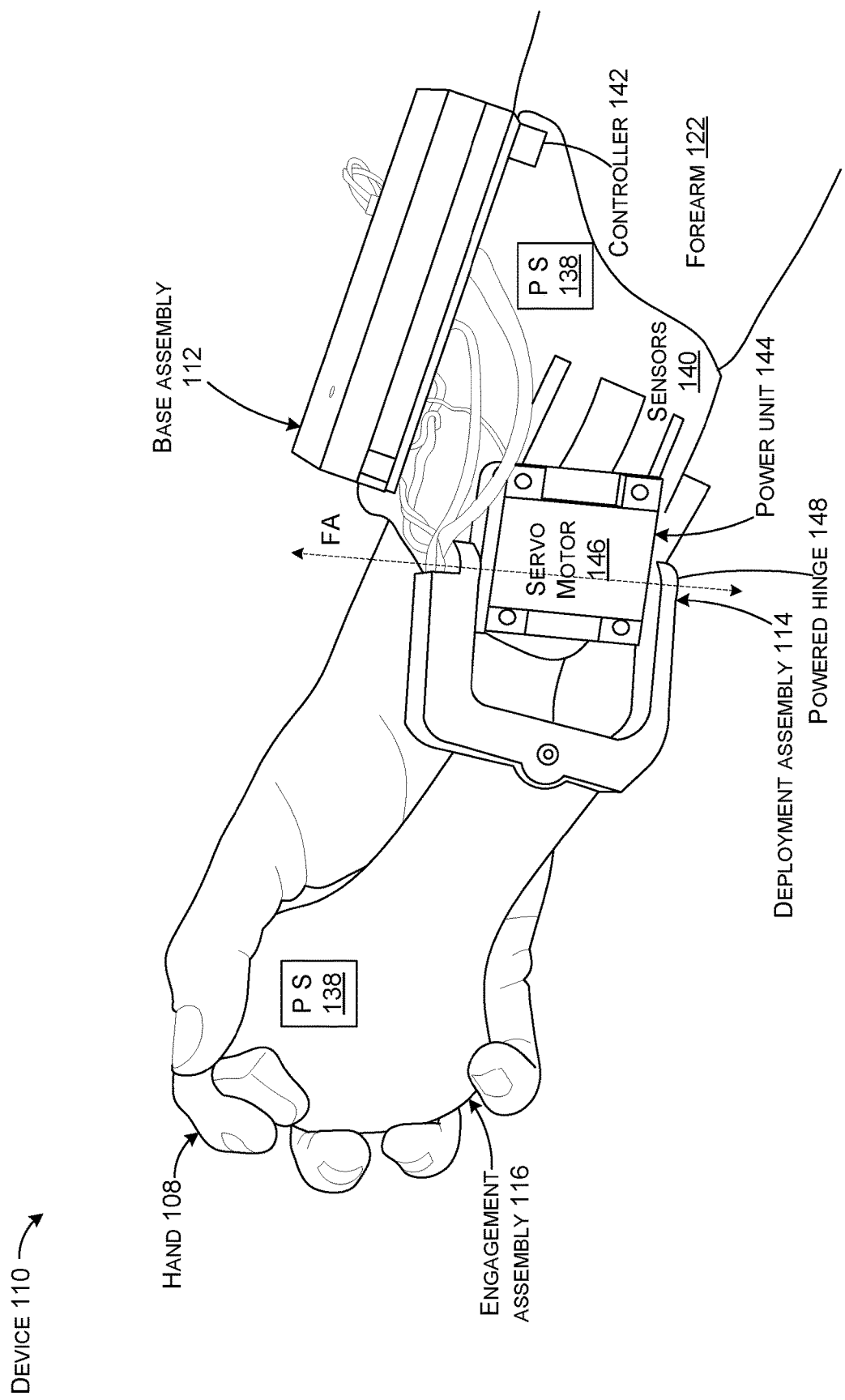
FIGS. 1B, 1C, 2A, 2B, 3A-3G, 4A-4B, 5A-5C, 6A-6B, 7A-7C, 8A-8B, 9A-9D, 10A-10B, and 11A-11D illustrate perspective views of example deployable controllers, consistent with some implementations of the present concepts.
Figure 1C:
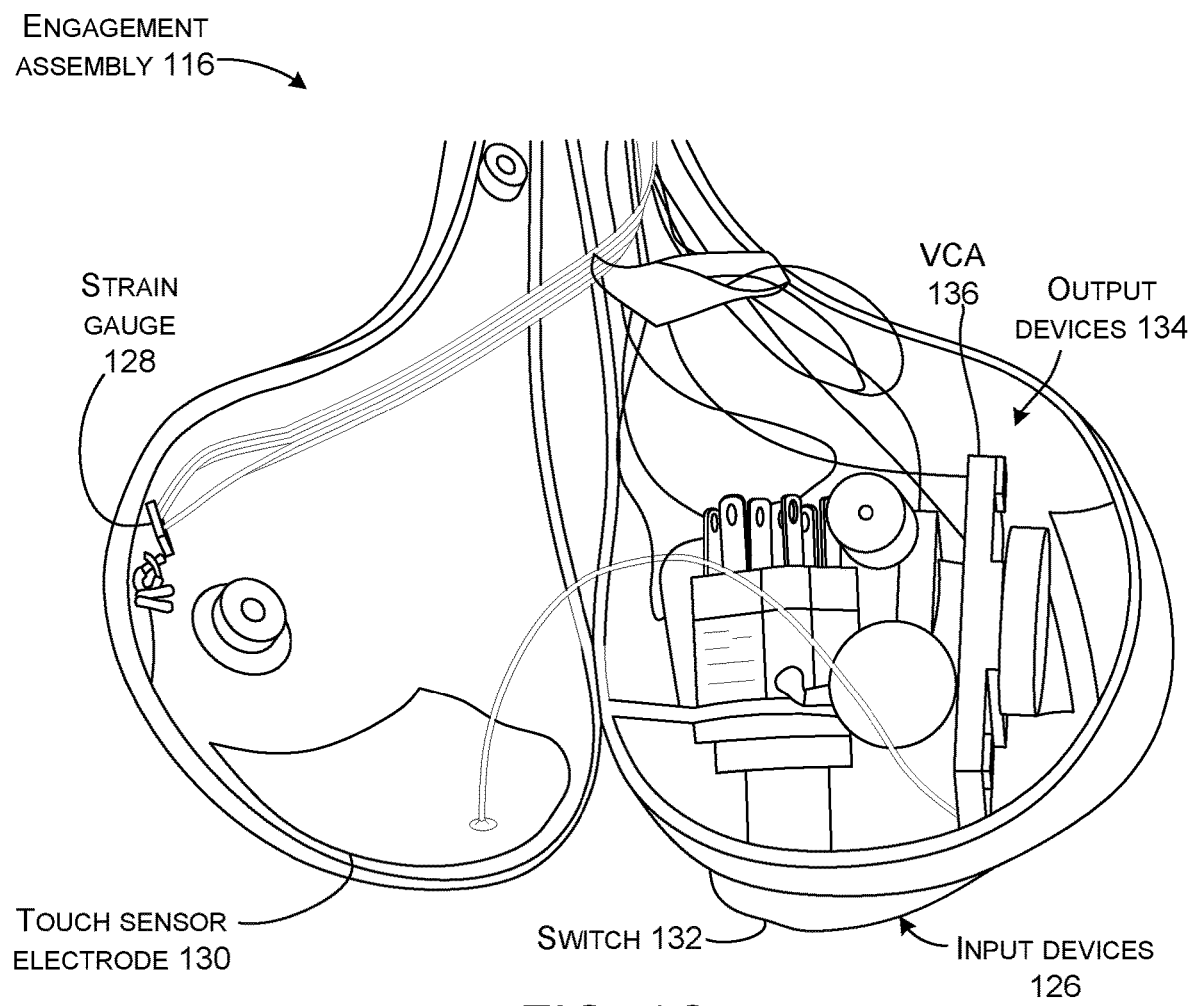

FIG. 1A illustrates a system 100, consistent with some implementations of the present concepts. FIGS. 1A-1C collectively described aspects introduced in FIG. 1A. For purposes of explanation, the system 100 is explained relative to a virtual reality use case scenario, but can alternatively or additionally be implemented in other use case scenarios. The system 100 can include a base station 102. In some configurations, the base station 102 can include hardware and/or software for generating and executing a virtual reality world, including receiving and processing inputs from a user 104, and generating and outputting feedback to the user 104. The base station 102 may be any computing device, including a personal computer (PC), server, gaming console, smartphone, tablet, notebook, automobile, simulator, etc.

In some implementations, the system 100 can include a headset 106. The headset 106 may be, for example, a head-mounted display (HMD) that can receive information relating to the virtual reality, the real world (e.g., the scene), and/or the user. In some implementations, the headset 106 may include one or more sensors (not shown in FIG. 1A) for providing inputs to the base station 102 and/or the headset 106. The sensors may include, for example, accelerometers, gyroscopes, cameras, microphones, etc. The headset 106, therefore, may be capable of detecting objects in the user's surrounding, the position of the user's head, the direction the user's head is facing, whether the user's eyes are opened or closed, which direction the user's eyes are looking, a location of user body parts, such as hand 108, etc. The headset can have capabilities to present data, such as audio and/or visual data to the user 104.

The system 100 may further include a deployable controller device 110. The device 110 can include a base assembly 112, a deployment assembly 114, and an engagement assembly 116, which can function as a deployable controller 118. Consistent with the present concepts, the device 110 may be engaged by the user's hand 108 to provide inputs and/or outputs with the base station 102 and/or the headset 106. Examples will be described in more detail below relative to FIGS. 3A-3E.

The example system configuration of FIG. 1A is only one of the contemplated system configurations. For instance, another system configuration can entail a device 110 that works in cooperation with an audio device, such as earphones. For a visually impaired user, the earphones can provide audio input to the user and the device 110 can provide corresponding haptic input. Systems employing other devices working alone or in combination are contemplated.

In the illustrated example of FIGS. 1A and 1B, the base assembly 112 can be configured to ground the device to a non-hand body part 120 of user 104. For instance, the base assembly 112 can be secured to a forearm 122 or upper arm 124 of the user. In some cases, the base assembly can be secured one joint above (e.g., toward the torso) the body part that engages the engagement assembly 116. For instance, in the illustrated configuration, the engagement assembly is configured to be engaged by the user's hand and the base assembly 112 can be secured above the wrist to the forearm.

FIG. 10 shows the engagement assembly 116 split in half so the interior contents are visible. Looking at FIGS. 1A and 1B in combination with FIG. 10, the engagement assembly 116 can be configured to receive tactile input from a hand of the user and/or to deliver tactile output to the hand of the user. For instance, the engagement assembly 116 can include various input devices 126 to detect user inputs. Examples of input devices can include pressure sensors, force sensors, such as strain gauges 128, capacitive touch sensor electrodes 130 and/or user activatable switches 132 (e.g., triggers), among others. In this implementation, there are four capacitive touch sensor electrodes 130 inside the engagement assembly 116 that can function to distinguish different grasps. This data can be utilized to allow the device to predict the user's intentions. In this case, there is one area of capacitive touch sensor electrodes facing the palm which comes in contact first, then around the middle finger to detect when it is grabbed, and two patches for the thumb to be able to use as a rough position input device.

The engagement assembly 116 can include various output devices 134, such as microphones, buzzers, voice coil actuators (VCAs) 136, surface simulators such as balloons, and/or heaters/coolers, among others.

The device 110 can also include various positional sensors 138, such as six-axis (e.g., 6-DOF) sensors, inertial measurement units (IMUs), etc. The positional sensors 138 can provide data relating to a location of the device in 3D space (e.g., x, y, and z coordinates), the orientation of the device, rotation, acceleration, etc. The positional sensors 138 can be positioned on multiple assemblies or a single assembly. For instance, six-axis sensors could be positioned on both the engagement assembly 116 and the base assembly 112. Note that the terms 'input devices' 126 and 'positional sensors' 138 are used herein for purposes of explanation, but these terms can be overlapping. For instance, the input devices listed tend to be sensors.

Various device implementations can include other sensors, input devices, and/or output devices. For instance, various sensors could be positioned on the deployment assembly 114. In another case, various sensors 140 could be positioned on the base assembly. Some of these sensors 140 could be configured to sense underlying physiological aspects of the user. For instance, the sensors could sense tendons extending from the fingers into the forearm. Information from the sensors could indicate the position of individual fingers, movement of fingers, direction of that movement, forces, such as grasping forces, etc. Alternatively or additionally, the sensors 140 could include cameras, such as IR depth cameras to provide locational data about the hand/fingers. As used herein, the term 'fingers' can include the thumb.

Other sensing implementations are contemplated. For instance, the device 110 could sense more user input and utilize this input to inform its haptic behavior. For example, some implementations can integrate finger tracking around the engagement assembly (e.g., such as through a self-capacitive array or a wearable camera) and could approach the user's palm and fingers during interaction and provide haptic response for dexterous input. This could also allow sensing torque on the lever, which would aid in the device's ability to simulate gravity and its rendered resistance to heavy objects. These aspects are discussed below relative to FIGS. 7A-8B.

The device 110 can also include a controller 142 and a power unit 144. In this case, the power unit 144 is manifest as a servo motor 146, but other types of power units, such as other types of motors, pneumatic systems, and/or hydraulic systems can be employed. The servo motor 146 can create a powered hinge 148 that rotates around a first axis (FA). The controller 142 can receive information from the input devices 126 and positional sensors 138. The controller can control the device, such as the power unit 144, at least in part, based upon this information. One such example is described in more detail below relative to FIGS. 2A and 2B.

In some cases, the controller 142 can receive other information, such as virtual data (e.g., data relating to virtual objects). The controller 142 can use this additional information in combination with the data from the input devices 126 and the touch sensor electrodes (e.g., positional sensors) 130 to control the device 110. One such example is described in more detail below relative to FIGS. 3A and 3E. Such a configuration could provide information about the position of the engagement assembly 116 relative to the base assembly 112, rotation of the engagement assembly 116 around the base assembly 112, and/or velocities and/or acceleration of the engagement assembly and/or the base assembly.

Note that various conductors (shown but not designated) can be employed to communicatively couple various elements and/or to power various elements. Alternatively, some elements of the device 110 could employ wireless technologies, such as Bluetooth™ to communicate within the device (e.g., controller 142 and input devices 126) and/or with other devices (e.g., base station 102 and headset 106). The device 110 can also include a battery (shown but not designated) and/or be tethered to another device to receive power. The tethering could also communicatively couple the device with other devices, rather than employing wireless technologies.

Figure 2A:
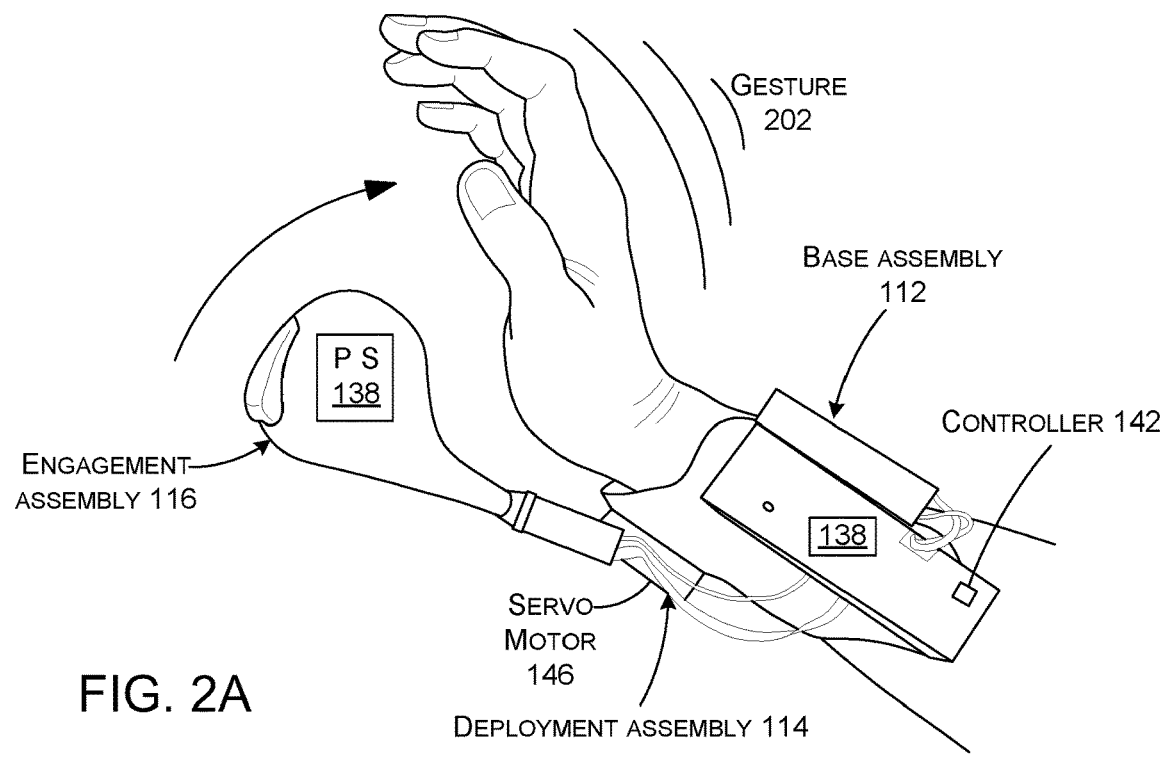
Figure 2B:
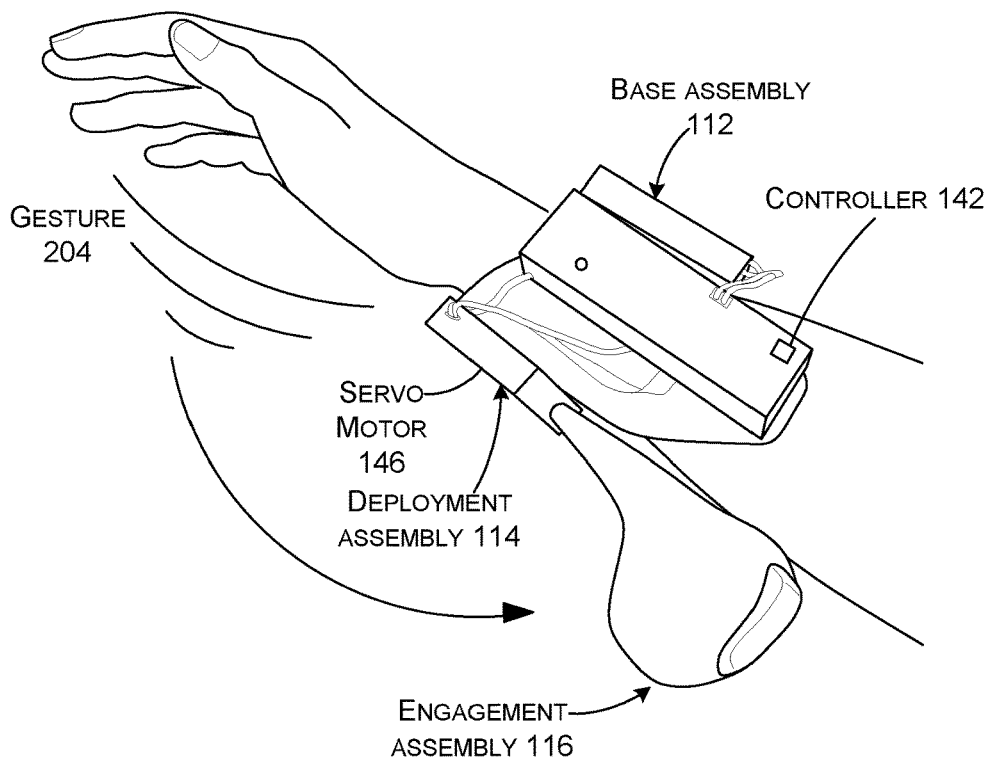

FIGS. 2A and 2B collectively show a technique for controlling deployment of the engagement assembly 116 of device 110. FIG. 2A show the engagement assembly 116 deploying to, and almost in, a deployed orientation and FIG. 2B shows engagement assembly 116 deploying to, and almost in, a stored orientation. In this case, the controller 142 can cause deployment upon detecting a specific user gesture representing a user command. In this example, the user gesture is manifest as an upward wrist-flip gesture 202 or a downward wrist flip 204. In this example, the controller 142 can obtain data from positional sensors 138 on the base assembly 112 and/or the engagement assembly 116. The controller can interpret the data to detect a gesture. The controller can then cause the deployment assembly 114 to deploy the engagement assembly 116 to accomplish the user command. In the example of FIG. 2A, the controller 142 interpreted the sensor data as a 'deploy' gesture 202 and caused the servo motor 146 to move the engagement assembly 116 to the engagement orientation. In the example of FIG. 2B, the controller 142 interpreted the sensor data as a 'store' gesture 204 and caused the servo motor 146 to move the engagement assembly 116 to the storage orientation. In other configurations, the controller may interpret a cessation of engagement as a 'store' gesture. Thus, if the user finishes interacting with the engagement structure and lets go, the sudden lack of pressure and/or other input to the engagement assembly can be interpreted as meaning the user is finished with the engagement assembly and the controller can cause it to be stowed.

From one perspective, FIGS. 2A and 2B illustrate an example of how user gestures can cause the engagement assembly 116 to be deployed or stored. In this example, device sensors detect a summon gesture in FIG. 2A and a dismiss or store gesture in FIG. 2B. In this case, the summoning gesture is similar to catching a yo-yo as shown in FIG. 2A. The device's sensors, such as accelerometers can detect this motion and actively drive the engagement assembly into the user's hand. In some configurations, the engagement assembly can offer similar ergonomics and functionality compared to a common VR controller, including touch sensing and a trigger button. In some cases, the device can include a modular design that separates the device's input space from its control and actuation, which can facilitate different engagement assemblies. In some configurations, the engagement assemblies can be readily swappable to better match a user's needs or preferences in a particular scenario. An example of such a configuration is described below relative to FIGS. 11A-11D.

Figure 3A:
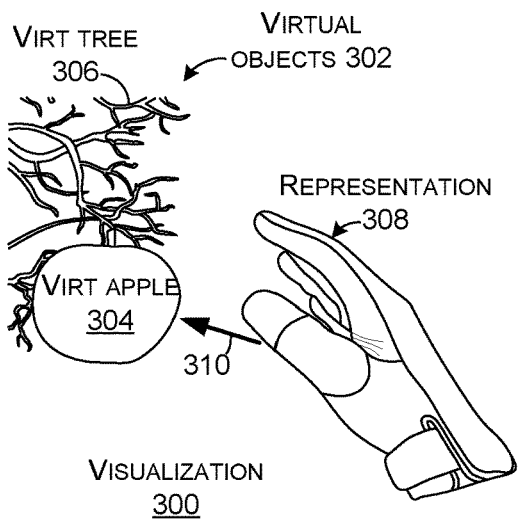
Figure 3B:
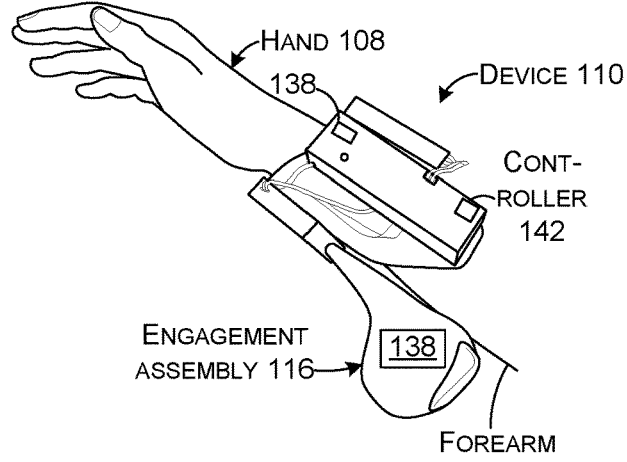
Figures 3C, 3D:
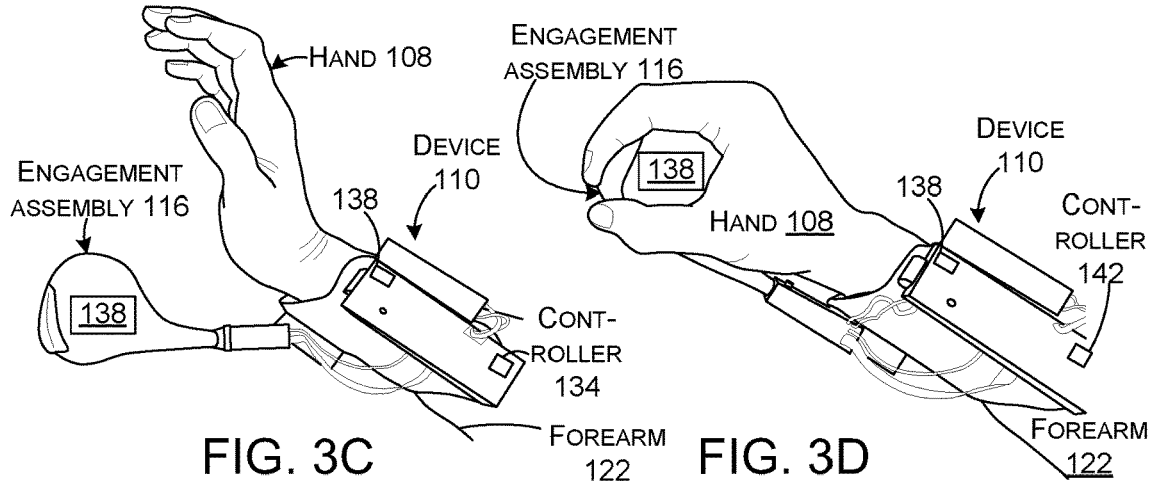
Figure 3E:
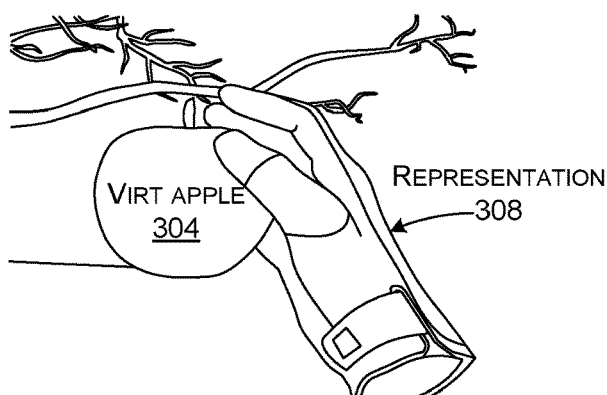
Figures 3F, 3G:
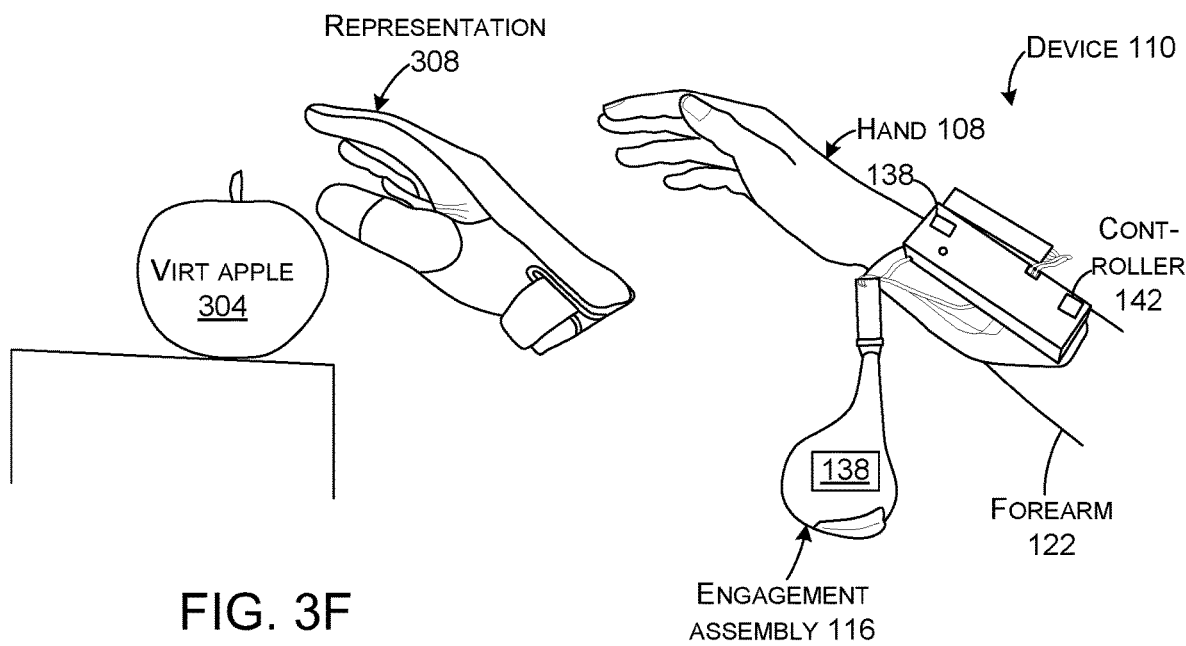

FIGS. 3A-3G collectively show another technique for controlling deployment of the engagement assembly 116 of device 110. In this case, FIGS. 3A, 3E, and 3F show visualizations 300 that may be generated for the user, such as by headset 106 of FIG. 1A. FIGS. 3B-3D and 3G show the same scene, but from the perspective of an outside observer.

In this case, as shown in FIG. 3A, the visualization 300 includes virtual objects 302 in the form of a virtual apple 304 hanging from a virtual tree 306 at a 3D location. The visualization 300 also includes a representation 308 of the user's hand at a location corresponding to a 3D location of the user's actual hand 108. In this example the user's hand 108 is approaching the virtual apple 304 as indicated by arrow 310 (e.g., the user is reaching for the virtual apple 304.

FIG. 3B shows the user's hand 108 at the same time as FIG. 3A, but from the perspective of an outside observer. The user is wearing the device 110. The controller 142 can utilize visualization data from the headset about the virtual object, e.g., size, shape, mass, 3D location, velocity, acceleration, etc. (e.g., virtual reality data) and data from the positional sensors 138 as input to determine how to control the device 110. Here, the data indicates that the user is reaching for the virtual apple and will soon (e.g., in a calculable extrapolated time given the distance between the hand and the virtual apple and the velocity of the hand) likely attempt to grasp the virtual apple. The controller 142 can utilize movement trajectories to predict in advance when the user's hand will get in contact with the virtual object 302. This time projection, combined with existing models of grasping, can further help with the multisensory integration to increase the illusion of real grasp.

Based upon this time prediction/calculation, the controller can cause the deployment assembly 114 to deploy the engagement assembly 116 at an appropriate time and rotational velocity or rate represented by FIG. 3C to cause the engagement assembly to contact the user's palm at the location of the virtual apple as shown in FIG. 3D.

FIG. 3E shows the same point in time as FIG. 3D, but from the perspective of the user. The user's hand contacts the engagement assembly 116 at the time and location the user expects to contact the virtual apple.

FIG. 3F shows the visualization 300 when the user subsequently sets the virtual apple on a surface and lets go of it. FIG. 3G shows the same view from the perspective of an outside observer. Note that as the user releases the virtual apple in FIG. 3F, the user is actually releasing the engagement assembly 116 that can automatically drop away and be stowed. Thus, the device 110 can render the visio-haptic sensation of grasping and releasing an object. This cannot be accomplished with existing haptic controllers.

Thus, this series of FIGS. 3A-3G show how the device 110 can automatically deploy the engagement assembly based at least in part on data from a virtual scenario to mimic real-world sensation to the user. The illustrated engagement assembly shape can render different object forces and the rendering of force provides a good sense of object weight and inertial force when held in the hand. Further scenarios are described below relating to allowing the user to 'throw' or 'set down' the apple.

As illustrated above, one novel aspect of device 110 is its ability to automatically deploy the engagement assembly 116 so that it appears visually and physically and with a believable force in the user's hand at the appropriate time when interacting with VR content. Similarly, the engagement assembly 116 can 'disappear' (e.g., be stowed) when the user sets the VR object down (e.g., lets go of the virtual object) or throws the object. The transition can either be invoked through a user gesture as illustrated in FIGS. 2A and 2B and/or may be automatically triggered by the application as illustrated in FIGS. 3A-3G.

Recall that as mentioned above, device 110 can be secured to (e.g., grounded to) a different body part than the body part that engages it. In the illustrate configuration, the device 110 is secured to the forearm 122 and the engagement assembly 116 is engaged by the hand 108. This aspect can enable at least two additional features of device 110 that are discussed below. First, when not in use, the engagement assembly 116 can be stored out of the way so the user can interact normally with the physical environment. This feature is discussed below relative to FIGS. 4A and 4B. Second, grounding the device to a different part of the body than the engaging portion can allow the device to impart forces on the engaging body part to simulate real world forces, or at least scaled but believable forces, such as those experienced when lifting, throwing, catching, etc. This feature will be discussed below relative to FIGS. 5A-5C.

Assume at this point that relative to FIG. 3F, the user sets down the virtual apple 304 and is temporarily done with the visualization. At this point, the engagement assembly can be automatically stowed out of the way and the user can engage physical objects with his/her hand.

Figure 4A:
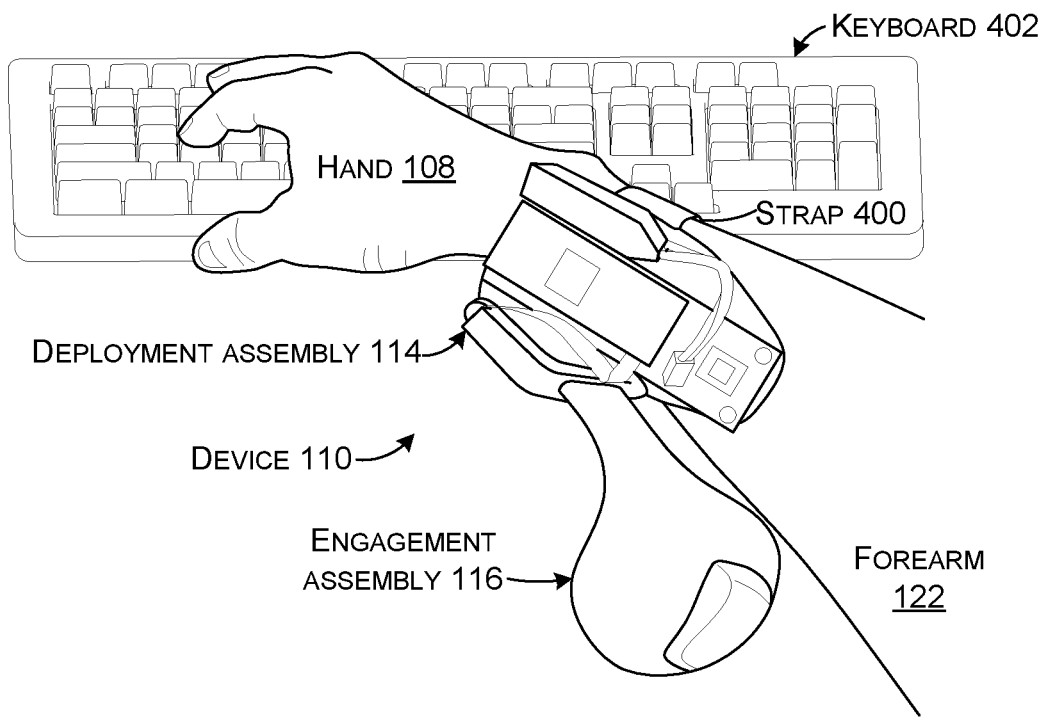
Figure 4B:
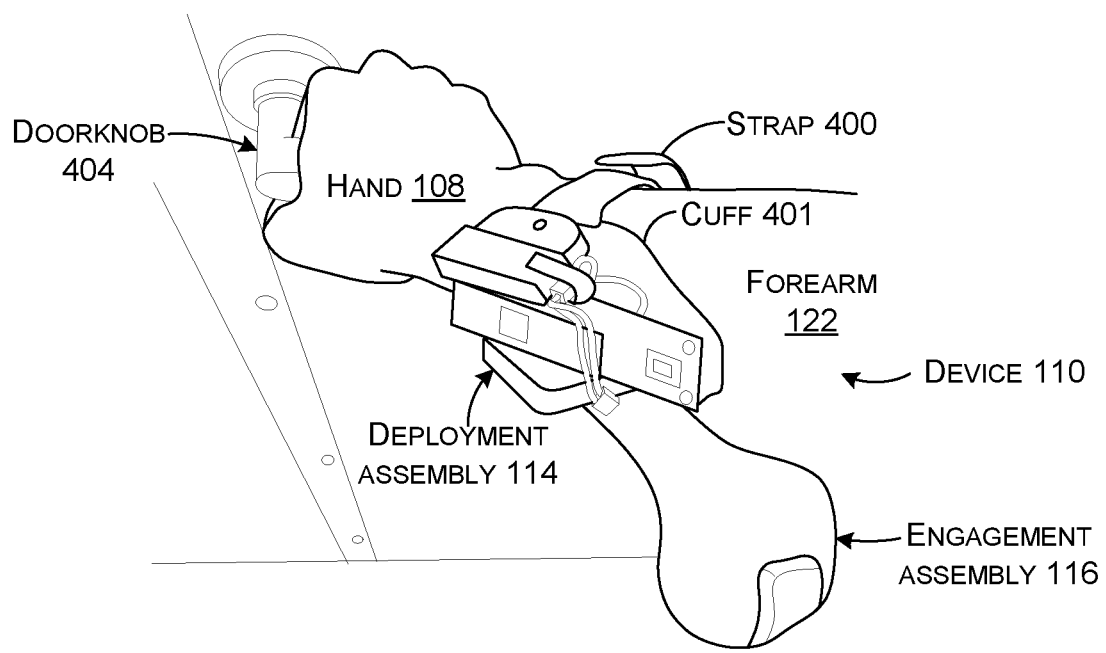

FIGS. 4A and 4B show device 110 worn by the user. In this case, the base assembly 112 can include a mechanism for securing the device to the user's forearm 122. In this example, the mechanism is manifest as one or more straps 400 that work cooperatively with a cuff 401. The straps 400 can extend from one side of the cuff 401 and can be wrapped around the user's forearm to the other side of the cuff to secure the base assembly 112 to the forearm. Various strap materials can be used. Elastic materials tend to provide comfort while maintaining a secure relationship between the device and the forearm.

FIGS. 4A and 4B show device 110 with the engagement assembly 116 in the stowed orientation. In such a case, the user is able to perform manual tasks with the hand associated with the device. For instance, FIG. 4A shows the user typing on keyboard 402 with the same hand 108 that would engage the engagement assembly 116 in the deployed orientation. Similarly, FIG. 4B shows the user opening a doorknob 404 with this hand. The user experiences normal dexterity with this hand as well as normal touch sensation. In contrast, with a traditional handheld controller, the user would have to set the controller down, put it in a pocket, or take some other action to free up his/her hand. Similarly, if the user was wearing a traditional glove-type controller, the user would have to deal with diminished or changed sensation that occurs when wearing a glove when trying to accomplish these tasks.

From one perspective, in the stowed orientation, the deployment assembly 114 can position the engagement assembly 116 at a location relative to the user's forearm so that it minimally interferes with the user's free-hand activities. This stored orientation can afford users not just free-hand interaction, but also the possibility to use tangible real-world objects such as keyboards and mice or door handles, among others. This may be especially useful in augmented reality (AR) scenarios where the user often engages both virtual objects and physical objects. The present implementations can allow the user to easily and quickly deploy the engagement assembly, use it as a controller relative to the virtual content, and then easily and quickly restow it.

Recall that one feature of the present concepts is the ability to render haptic sensations relating to touching, grasping, lifting, throwing, catching and/or releasing virtual objects. A first example is shown in FIGS. 5A-5C.

Figure 5A:
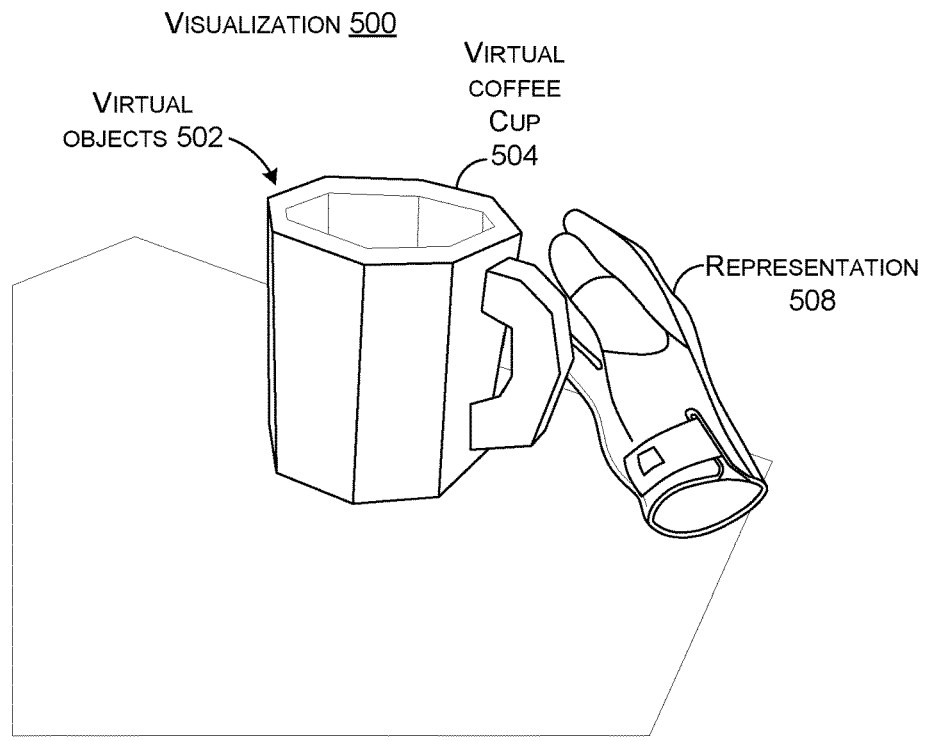
Figure 5B:
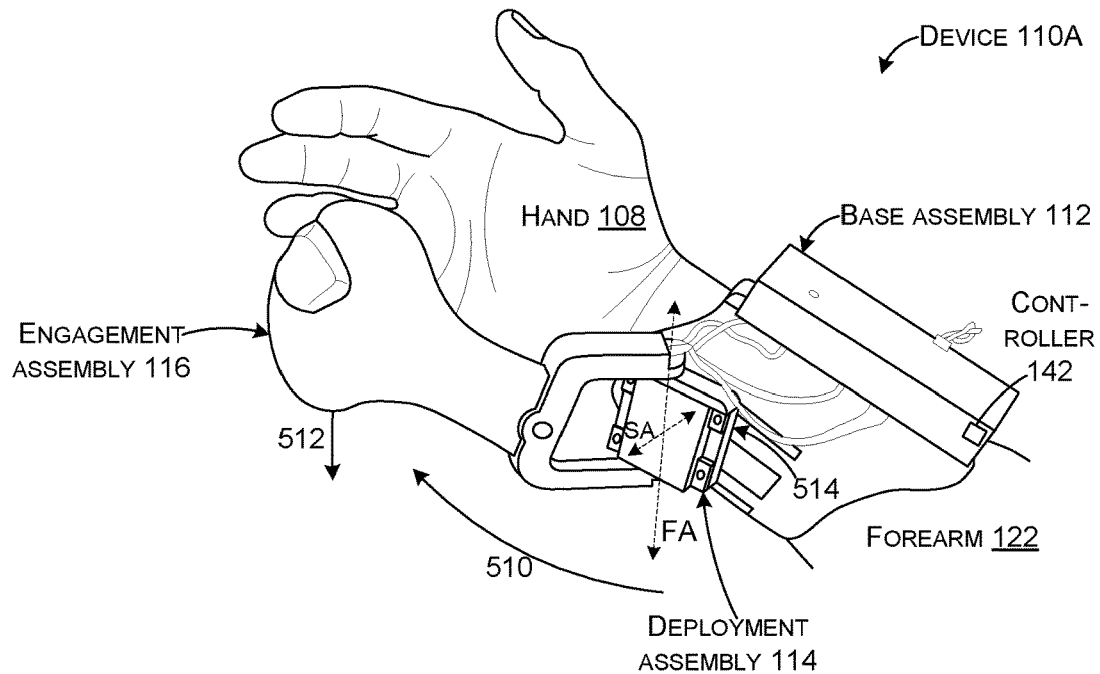
Figure 5C:
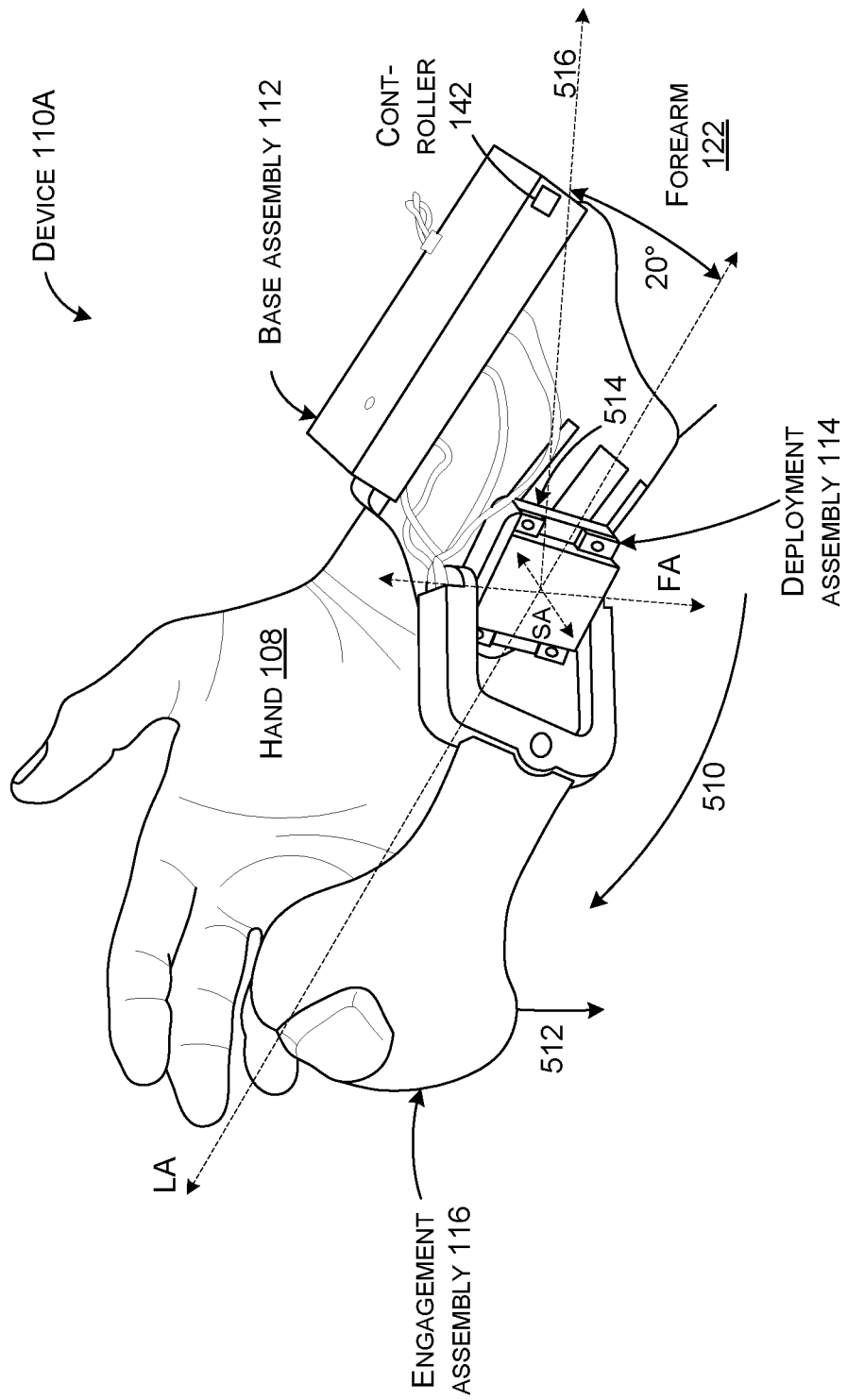

FIGS. 5A-5C collectively relate to a scenario of a user picking up a virtual object with a device 110A. In this case, FIG. 5A shows a visualization 500 that may be generated for the user, such as by head set 106 of FIG. 1A. FIG. 5B shows the same scene, but from the perspective of an outside observer.

In this case, the visualization 500 includes a virtual object 502 in the form of a virtual coffee cup 504 and a representation 506 of the user's hand. FIG. 5B shows that when the user is reaching for the virtual coffee cup 504, the device 110A is deploying the engagement assembly 116 as indicated by arc or line 510, so that the engagement assembly 116 approaches the user's hand 108 in synchrony with the virtual object and, the moment the virtual hand collides with the coffee cup, the engagement assembly touches the user's palm, ready to accept grasp input. At this moment, the controller 142 switches off the servo motor 146, giving the user the possibility to move the engagement assembly passively on their own, increasing the sense that the object is "really" in their hand. This analog coupling between virtual objects and physical feedback can create a compelling sensation of acquiring and holding the virtual object. This type of interaction is also more natural than currently available techniques for acquiring virtual objects which are largely based on pressing buttons to automatically acquire and drop virtual objects.

In some implementations, the device 110 can also mimic the weight of the virtual coffee cup 504 by creating a downward force (represented by line 512) on the engagement assembly 116 as the user attempts to 'lift' the virtual coffee cup 504. For instance, the deployment assembly 114 can be rotatably driven counter-clockwise relative to the base assembly 112 to create a downward force on the user's hand that mimics the weight of the virtual coffee cup. Thus, this implementation could provide two axes of movement between the base assembly and the engagement assembly. First, as discussed relative to FIGS. 1A and 1B, the deployment assembly can include the powered hinge 148 (that can rotate the engagement assembly relative to a first axis (FA) that in this case is illustrated extending generally vertically. Second, the deployment assembly 114 can also include a rotation mechanism 514 (mostly occluded in this view) to rotate the deployment assembly relative to the base assembly along a second axis (SA) that is 90 degrees from the first axis and in FIG. 5B is generally horizontal and extending into and out of the drawing page. Thus, in this implementation, the powered hinge is a multi-axis powered hinge.

The rotation mechanism 514 can be controlled by the controller 142 to generate the downward force corresponding to events in the visualization 500. The rotation mechanism 514 can also include a breakaway clutch to prevent too strong of forces of from being generated that may otherwise harm the user or the device 110. Note that the powered hinge 148 can also include a similar breakaway clutch for similar reasons.

As introduced above, when the user reaches out to pick up the virtual coffee cup 504, the engagement assembly 116 can be gradually pivoted into the user's hand, matching the virtual coffee cup's position. This can create an analog sensation of making contact and grasping the virtual object.

FIG. 5C shows additional features introduced relative to FIG. 5B. In this case, the rotation mechanism 514 can allow the engagement assembly 116 to deploy along a path that does not lie in a plane (e.g., a complex path). For instance, assume that the engagement assembly is desired to engage the user's hand along a long axis (LA) of the user's forearm. However, assume that in a storage orientation, an angle away from the long axis, such as 20 degrees away from the long axis as indicated by line 516 is determined to be comfortable for the user. In this case, the controller 142 can cause the rotation mechanism 514 to rotate while the deployment assembly 114 is deploying or storing the engagement assembly to achieve the desired angle in each orientation. Another example configuration is described relative to FIGS. 6A and 6B.

FIGS. 5A-5C provide an example of grounding the base assembly 112 of the device 110 to a different part of the body than the part that engages the engagement assembly 116 and how this can allow the device to impart forces on the engaging body part to simulate real world forces, such as those experienced when lifting, throwing, catching, etc. In this case, the base assembly 112 is grounded to the forearm and the engagement assembly 116 is engaged by the user's hand.

Figure 6A:
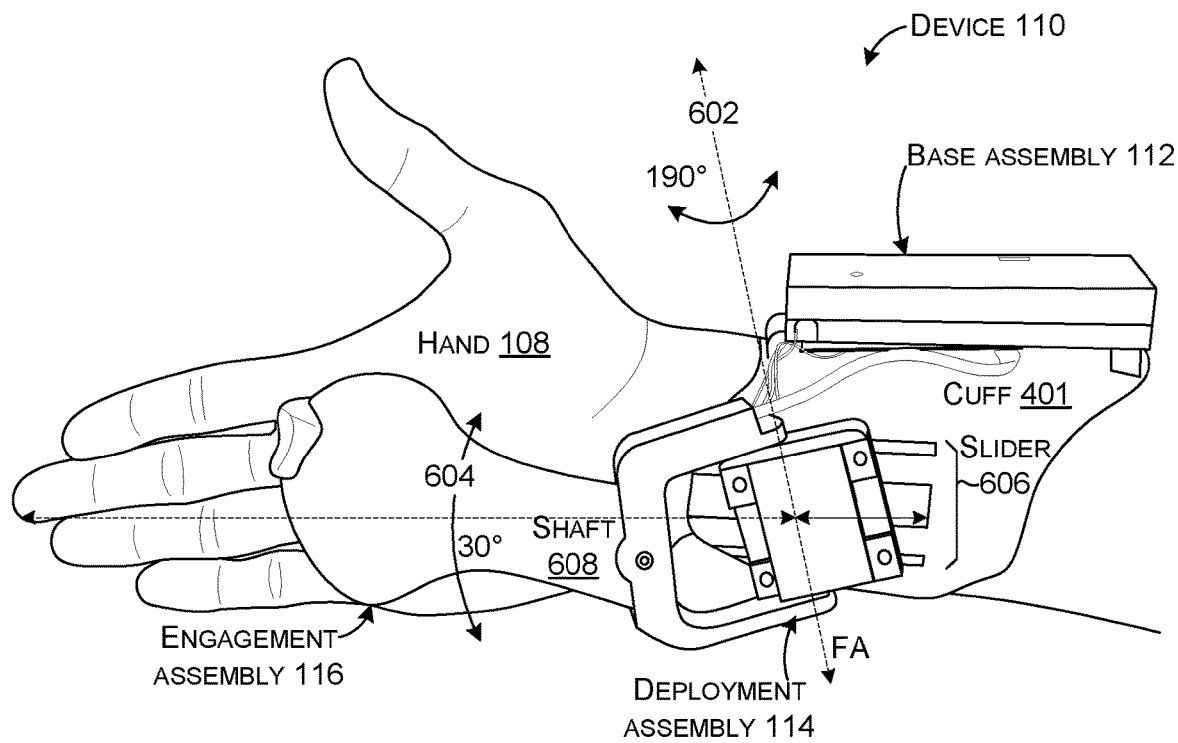
Figure 6B:
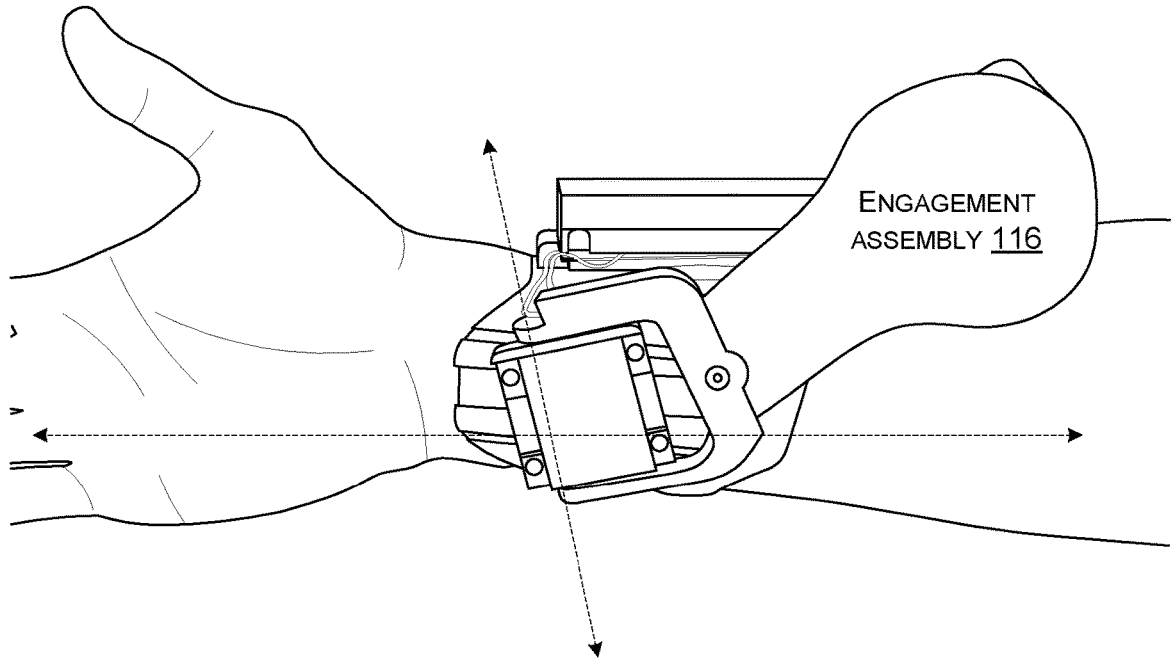

FIGS. 6A and 6B collectively show additional aspects of device 110. This implementation can employ a single-servo pivoting design. The moving parts can include the deployment assembly 114 which can actively pivot the engagement assembly 116 around a generally vertical axis (e.g., first axis (FA)) as indicated at 602. Thus, the powered hinge 148 of the deployment assembly is a single axis powered hinge. In this case, the deployment assembly 114 can rotate through a range of about 190 degrees, though other ranges are contemplated. The deployment assembly 114 can actively pivot the engagement assembly 116 around the first axis, while the engagement assembly 116 can provide passive up-down movement to accommodate tilting the hand as indicated at 604. In this case, the up-down movement is approximately 30 degrees, though other ranges are contemplated.

The base assembly 112 and the deployment assembly 114 can be adjustably secured to accommodate differing user physiologies (e.g., different sizes of users having differing long bone lengths) and/or preferences. In this case, the adjustability is accomplished via a slider 606 that allows the user to control the relative position of the deployment assembly 114. The position of the deployment assembly can control the position of the engagement assembly 116 in the deployed orientation for an individual user. Thus, users having larger/longer arms and hands and users having shorter arms and hands can both be accommodated. Further adjustability mechanisms are contemplated. For instance, a length of a shaft 608 extending between the deployment assembly 114 and the engagement assembly 116 can be adjustable.

Note that in the illustrated configuration, the first axis is slightly tilted from vertical. The choice of angle and axes of rotation for the engagement assembly 116 is deliberate in this implementation. As shown in FIGS. 6A and 6B, the deployment assembly 114 rotates the engagement assembly 116 not around the axis perpendicular to the hand, but around the tilted first axis. This is potentially important, because it can allow the engagement assembly 116 to not interfere with the thumb when pivoting into the palm. Further, this tilted axis can cause the engagement assembly 116 to be stowed at a location next to the user's arm where it least interferes with the hand during interaction with real-world objects or while resting on a table. See FIGS. 4A and 4B.

From one perspective, slider 606 can provide adjustability of the engagement assembly's position to accommodate different hand sizes. The three degrees of freedom of the device 110 can accommodate different hand sizes and motions of the user's hand.

Portions of the base assembly 112, deployment assembly 114, and the engagement assembly 116 can be formed from various materials, such as polymers. Individual polymers can be selected for the portions based upon their function. For instance, a somewhat flexible polymer can be selected for the cuff 401 to allow the cuff to accommodate different arm diameters and shapes. Upon putting on the device, the spring-like behavior of the cuff can hug the user's arm and can give it a comfortable but firm hold when used in combination with the strap (400, FIGS. 4A and 4B). Other portions may be made from more rigid polymers. For instance, the shaft 608 can be intended to be relatively rigid and so a polymer can be selected which provides this property. Polymers are desirable in that they are easily formed into various shapes, such as by injection molding or 3D printing. However, other materials, such as metals or composites can alternatively or additionally be employed.

Several examples are described above of device 110 simulating feedback from interacting with a non-grounded object. The discussion below relates to simulating interaction with grounded objects, like furniture or walls.

Figure 7A:
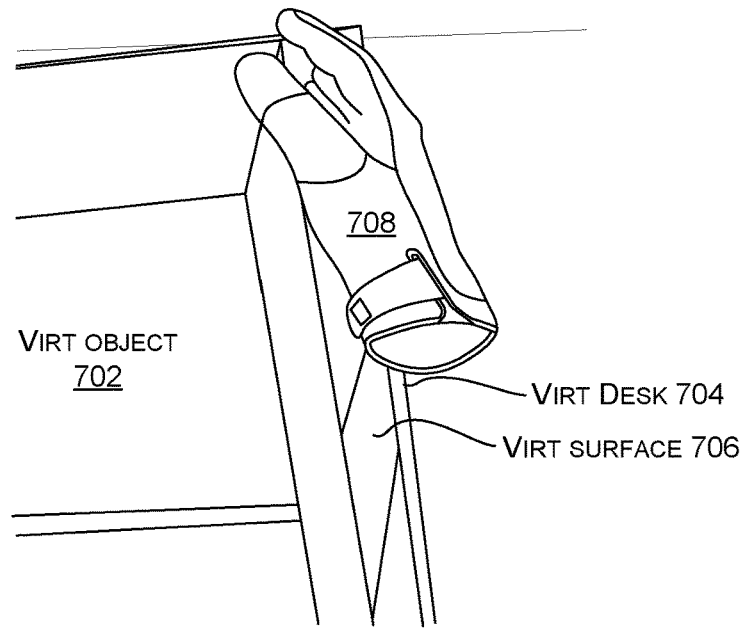
Figure 7B:
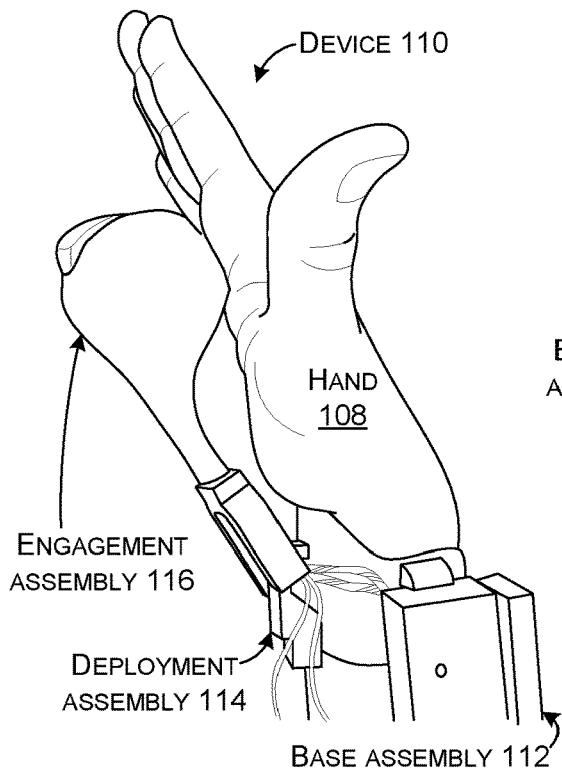
Figure 7C:
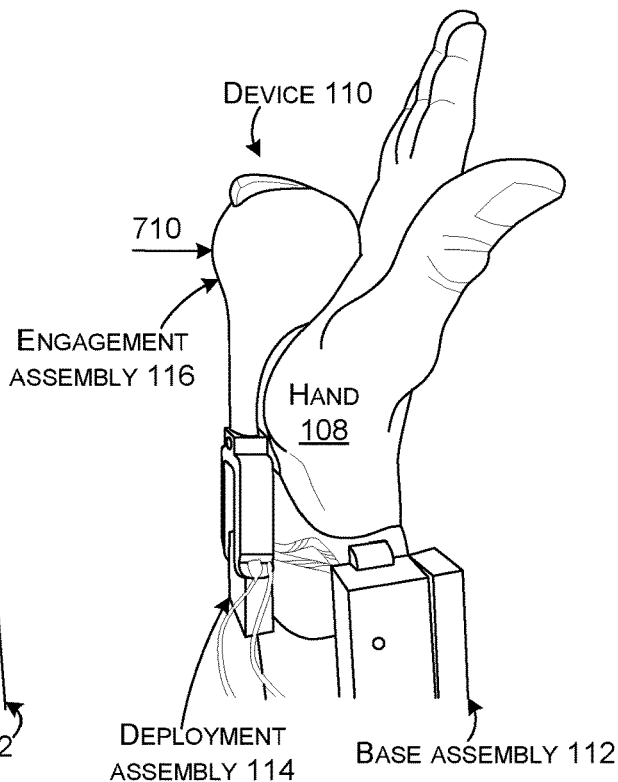

FIGS. 7A-7C collectively relate to device 110 simulating feedback sensations relating to grounded objects. FIG. 7A is a visualization 700 of the user touching a large virtual object 702 in the form of a virtual desk 704 having a flat virtual surface 706. Also, a representation 708 represents the user's hand. FIGS. 7B and 7C show the device 110 and the user's hand from an observer's standpoint.

When a user touches flat virtual surface 706 with their palm, the contact may only be perceived in the middle of the palm when using some implementations of device 110, but this sensation is strong enough to perceive the virtual surface as being there. FIGS. 5B and 5C show that by continuing to force the engagement assembly farther toward the user's hand, the device 110 can create the sensation of a 'resisting' to mimic virtual surface 706. Stated another way, as the user moves his/her hand toward the virtual surface the continued movement of the engagement assembly toward the user's hand can be proportional to the level at which the virtual hand penetrates the virtual surface as indicated by arrow 710. Stated another way continuing to actuate the deployment assembly 114 to move the engagement assembly 116 against the user's hand while it penetrates the virtual object, can create the sensation of 'resisting' the virtual object, such as pushing a heavy object on a surface.

Figure 8A:
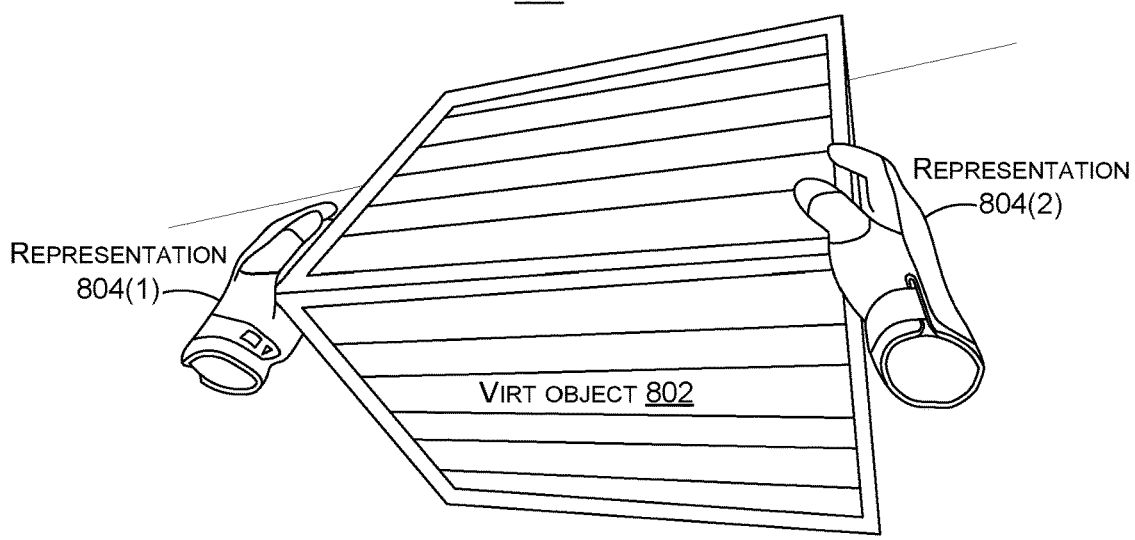
Figure 8B:
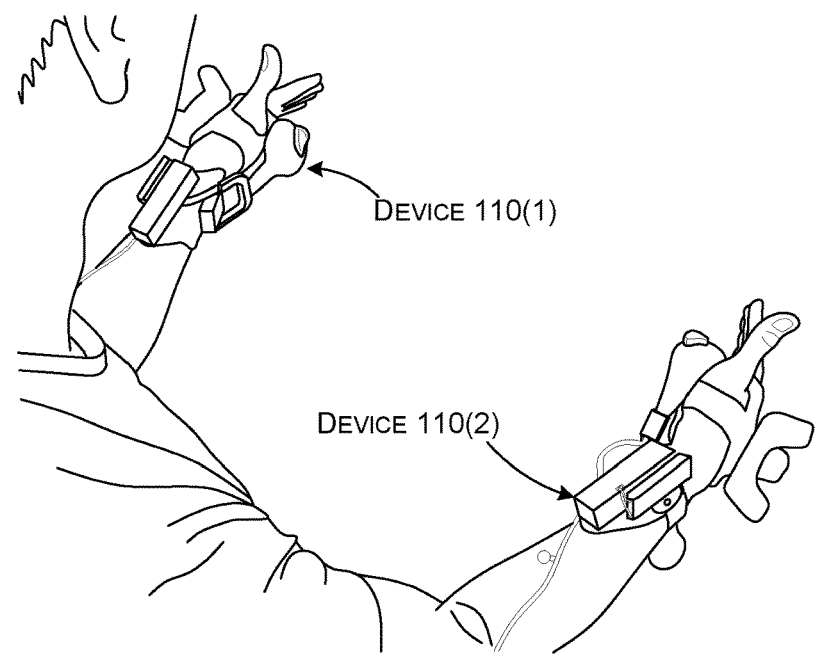

FIGS. 8A and 8B collectively show how similar principles can be applied to rendering haptic feedback in response to larger and heavier virtual objects. FIG. 8A shows a visualization 800 of the user lifting a heavy virtual object 802 (e.g. a virtual box). The user's hands are represented by representations 804(1) and 804(2). FIG. 8B shows a user wearing devices 110(1) and 110(2) on both hands. The devices 110(1) and 110(2) can render the corresponding forces on the user's hands, creating the perception of lifting the object against gravity. In this case, wearing devices on both hands can create haptic feedback for bimanual interaction, like lifting heavy objects.

Further, devices 110(1) and 110(2) can simulate the weight and bulk of lifting a virtual object despite their compact form factor and their being grounded close to the user's hands (e.g., to the user's forearms). Thus, the compact form factor can allow the devices 110 to be readily stored out of the way on the user's forearm when not in use and almost instantly deployed when needed/desired. Note also, that in some implementations, the shape of the engagement assembly can be adjusted to mimic the shape of the object being picked up. For instance, the engagement assembly can include multiple independently controllable chambers that can be filled to simulate a shape, such as a flattened shape of the virtual box. In other implementations, the engagement assembly may be interchangeable so that a version of the engagement assembly can be selected that is configured (e.g., shaped) to mimic a particular functionality and/or accomplish a particular task. This aspect is described in more detail below relative to FIGS. 11A-11D.

Further still, an individual device 110 can adjust the force that it exerts on the user's hand to simulate compliant objects, such as a squishy ball. In the illustrated configuration where the user employs devices 110(1) and 110(2) on both hands, the controllers can cooperatively simulate the compliance of an object held between them. For instance, the devices 110 could mimic a user squeezing a large balloon between their hands and could mimic air being added to the balloon so it pushed their hands apart. Similarly, the devices could mimic a pulling scenario, such as the user grasping a rubber band with both hands and stretching it.

Figure 9A:
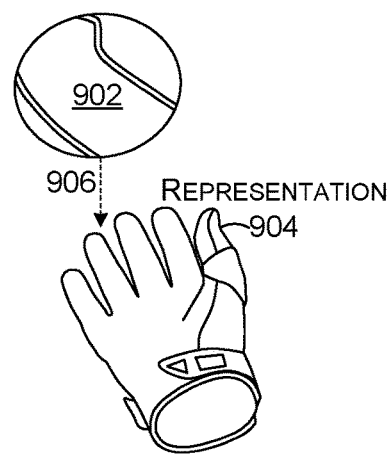

The discussion below relating to FIGS. 9A-10B relates to utilizing device 110 to simulate catching and throwing. FIG. 9A shows a virtualization 900 of a virtual ball 902 falling toward a representation 904 of the user's hand and the user positioning his/her hand to catch the virtual ball. The velocity and distance between the virtual ball and the hand (representation) is represented by arrow 906.

Figure 9B:
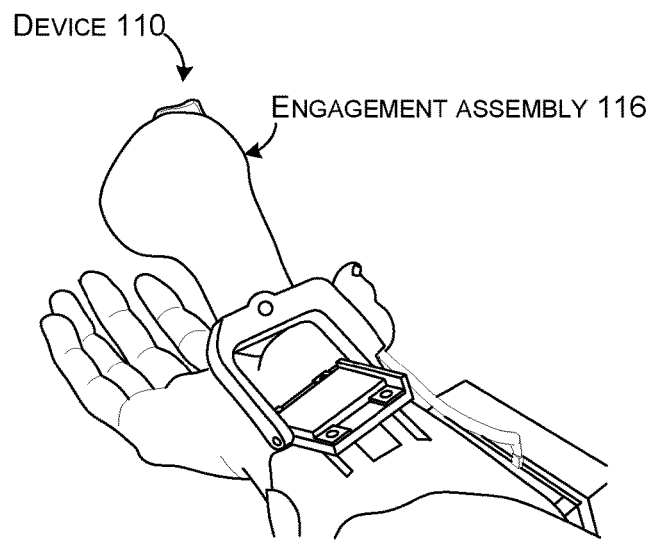
Figure 9C:
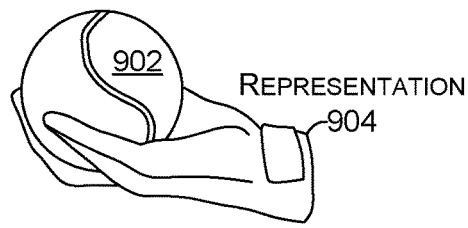
Figure 9D:
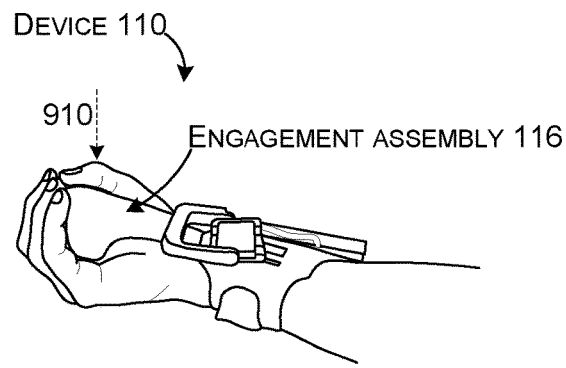

FIG. 9B shows the device 110 deploying the engagement assembly 116 at a time and velocity corresponding to a distance and velocity of the virtual ball from the hand. FIG. 9C shows a subsequent visualization 908 of the user catching the virtual ball 902. FIG. 9D shows the engagement assembly contacting the user's palm at the time and velocity expected by the user as represented by arrow 910. Thus, by quickly rotating the device's engagement assembly into the hand and imparting an impulse function upon predicted impact, it creates the sensation of catching an object.

The device 110 can naturally render haptic feedback in response to throwing and catching virtual objects. One novel aspect is that the device's process loop can detect when a virtual object is moving towards the hand, and ahead of time, predict the user's intention to catch it, so as to start deploying the engagement assembly 116 from the stowed orientation to account for the latency of the system and placing it in the user's hand at the time the user expects the object to make contact. The device can create realistic haptic feedback for catching objects because the device is grounded to the forearm. The device can further enhance the haptic impressions by generating a 'thud' impulse upon impact with the caught object and/or by creating an audible sound via the output devices (134, FIG. 1A).

Figure 10A:
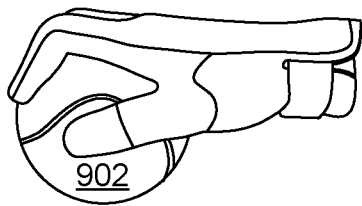
Figure 10B:
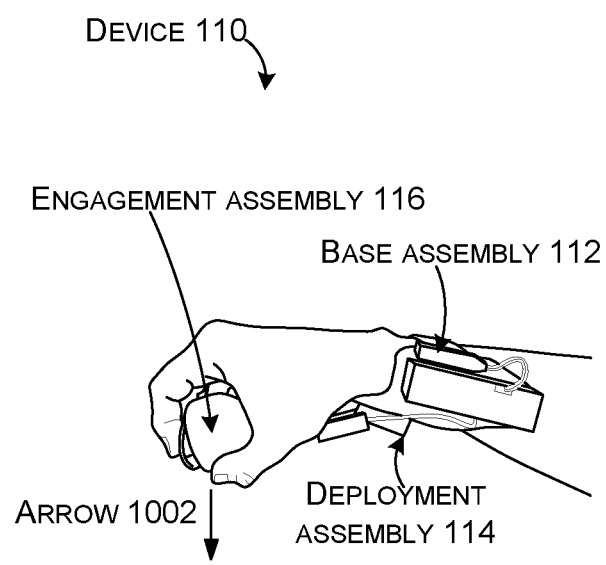
Figure 11A:
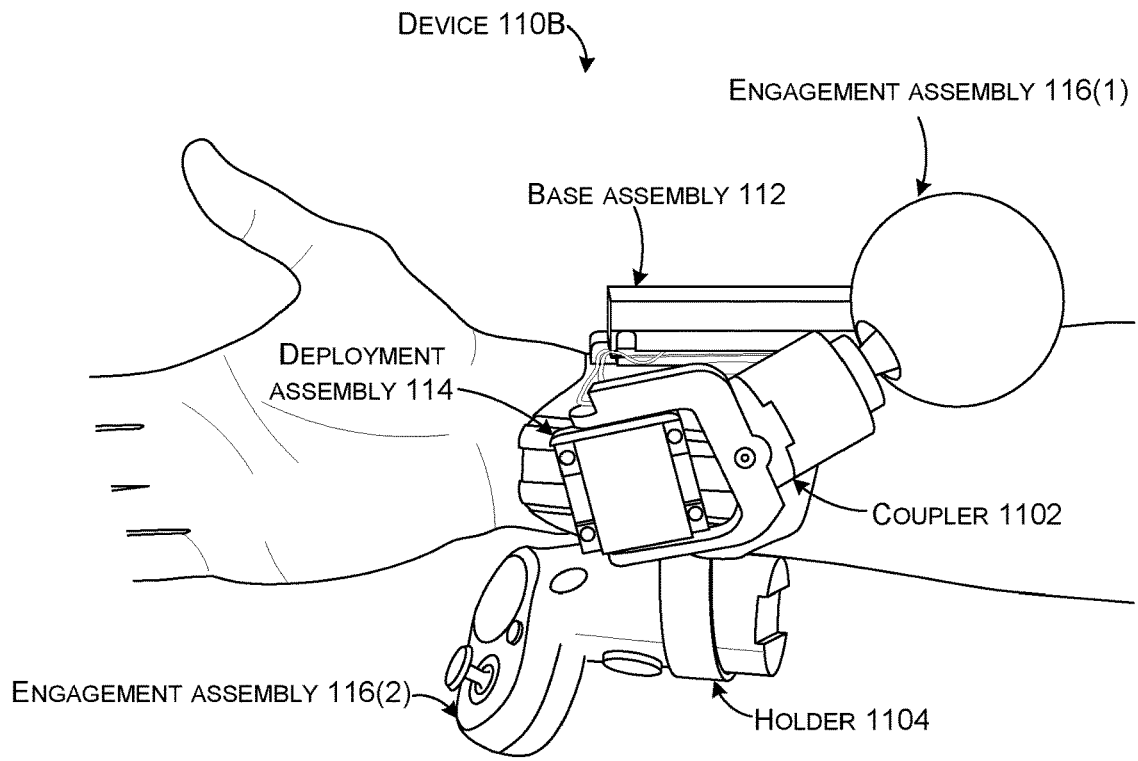
Figure 11B:
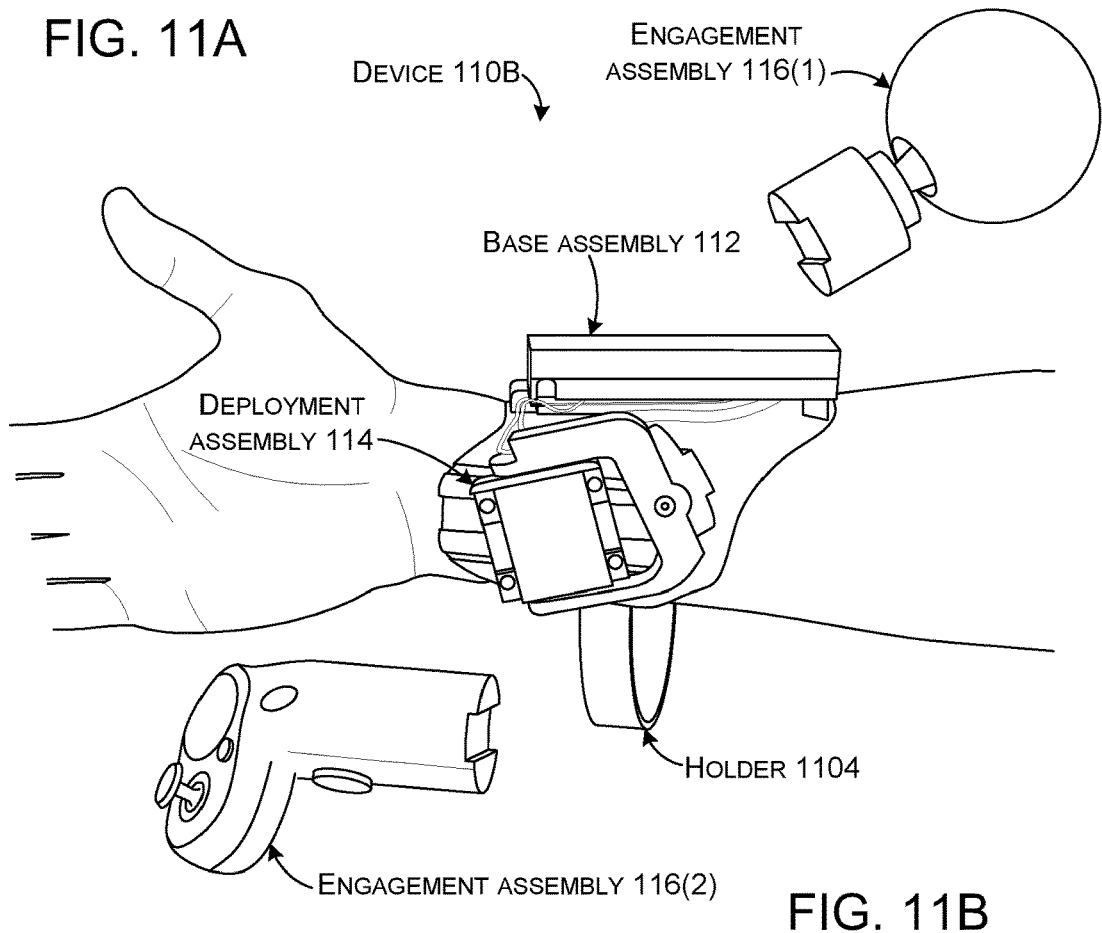
Figure 11C:
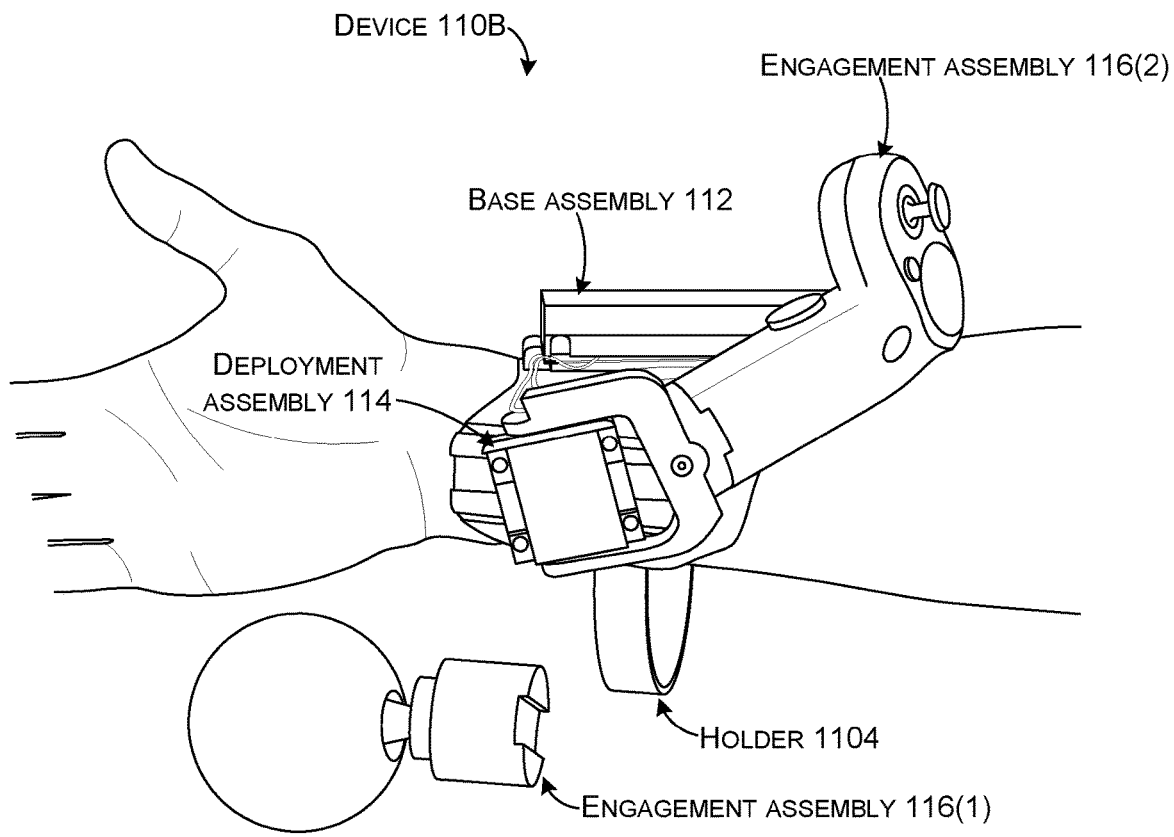
Figure 11D:
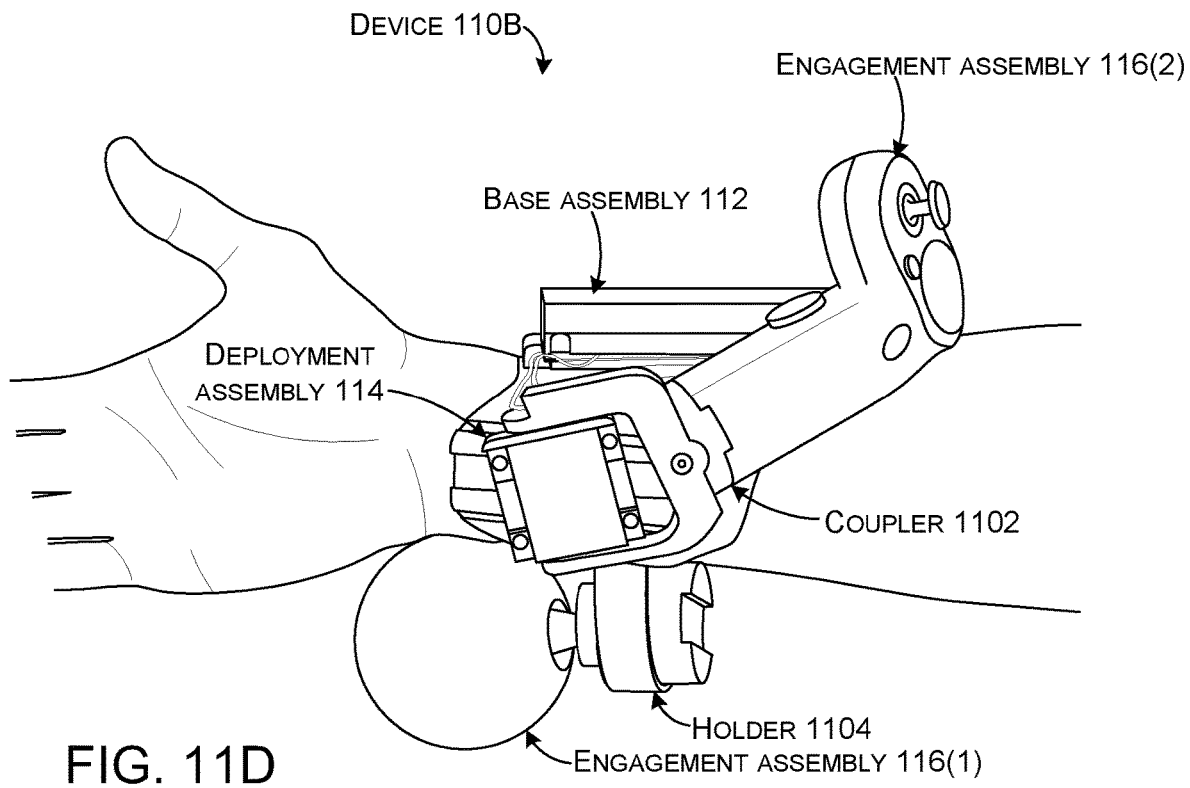

FIGS. 9C and 9D show how the device can render weight when the palm is facing upwards by pushing the engagement assembly 116 into the hand. The device can match the scale of intensity of the push force to the sine of the angle on the vertical axes to produce a reasonable effect. FIGS. 10A and 10B collectively show how the device 110 can impart similar forces pulling the object out of the hand when the palm is facing downward.

FIG. 10A shows a visualization 1000 of the user holding the virtual ball 902 in his hand (e.g., representation 904). FIG. 10B shows the device creating a downward force represented by arrow 1002 being generated by the device's deployment assembly 114 acting on the engagement assembly 116. The arrow 1002 can represent the expected gravitational force on the virtual ball 902. In this implementation, because deployment assembly 114 has one degree of freedom, it can render gravity forces when the palm is facing downward by pulling the engagement assembly 116 away from the hand.

In addition to touch feedback, device 110 can simulate dynamic forces of grasped objects. For instance, the device can continuously actuate its deployment assembly 114 when the user is grasping the engagement assembly 116 in their palm to produce a sensation of acceleration or friction forces exerted by the grabbed object. This force feedback can be scaled to various forces, such as gravity, inertia and friction drag.

The device 110 can be manifest as a wrist/forearm grounded VR/AR controller with a deployable haptic controller that pivots into and out of the user's hand on-demand. In contrast to existing VR controllers, the device can enable free-hand interaction in VR, as well as in the real-world, while acting as a handheld controller when needed. The device can position the engagement assembly proximate to the user's hand when approaching virtual objects. This can allow the user to grasp and/or release the virtual object consistent with the visual scenario. This can create the haptic sensation of touching, holding and releasing, as well as catching and throwing virtual objects. The device's active pivoting mechanism can also enable rendering static and dynamic forces acting on virtual objects such as inertia, gravity, and/or sliding friction.

FIGS. 11A-11D collectively show another device 1108. In this case, the engagement assembly 116 is readily removed and replaced with a variant that may be suited for a particular use case scenario. In this example, the deployment assembly 114 and the engagement assembly 116 collectively define a coupler or interface 1102. The engagement assembly 116 can be positioned against the deployment assembly 114 to complete the coupler 1102. The coupler 1102 can physically and electronically couple the engagement assembly with the deployment assembly. The user can interchange deployment assemblies 116 (e.g., remove the engagement assembly 116(1) or 116(2) and replace it with a different engagement assembly 116(1) or 116(2)). In this implementation, the device 1108 also includes a storage mechanism or holder 1104 for one or more engagement assemblies that are not currently being used. This implementation can allow the user to select an individual engagement assembly that the user prefers, either generally, or in specific scenarios and store other engagement assemblies out of the way and without risk of loss.

Figure 12:
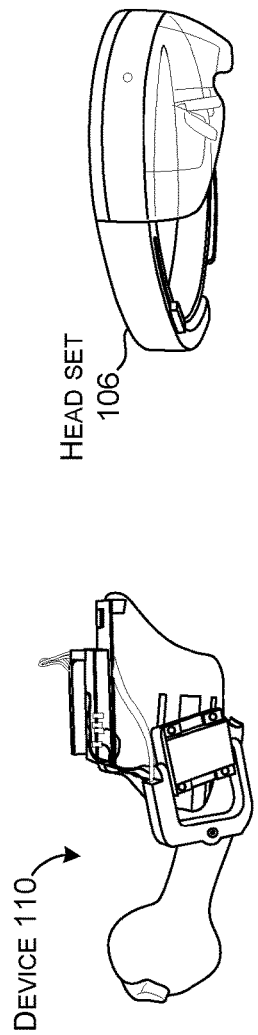
Figure 12:
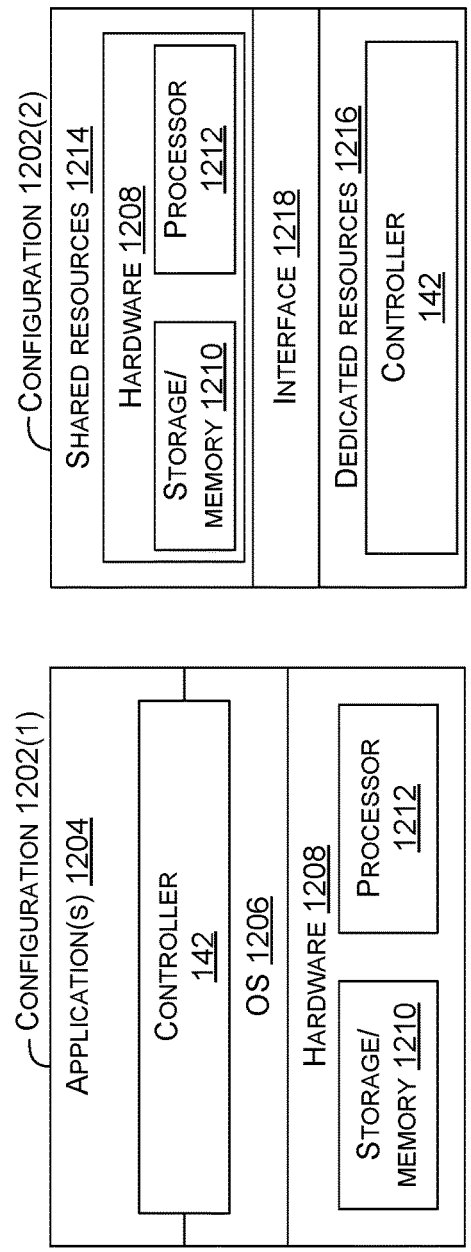

FIG. 12 shows further details of system 100, consistent with some implementations of the present concepts. The system 100 may include one or more devices 110, headset 106, base station 102, and/or other devices, such as personal computers, desktop computers, notebook computers, cell phones, smart phones, personal digital assistants, pad type computers, mobile computers, wearable devices, cameras, appliances, smart devices, IoT devices, vehicles, etc., and/or any of a myriad of ever-evolving or yet-to-be-developed types of computing devices. As mentioned above, any of these devices can operate in a free-standing manner to achieve a given functionality or can operate cooperatively with other devices to achieve the functionality.

FIG. 12 shows two example device configurations 1202 that can be employed by device 110, headset 106, base station 102, and/or other devices. Individual devices, such as device 110 can employ either of configurations 1202(1) or 1202(2), or an alternate configuration. (Due to space constraints on the drawing page, one instance of each device configuration is illustrated rather than illustrating the device configurations relative to each device). Briefly, device configuration 1202(1) represents an operating system (OS) centric configuration. Device configuration 1202(2) represents a system on a chip (SOC) configuration. Device configuration 1202(1) is organized into one or more applications 1204, operating system 1206, and hardware 1208. The hardware 1208 can include storage/memory 1210 and a processor 1212. Other hardware 1208, such as the base assembly 112, deployment assembly 114, and engagement assembly 116, are described in detail above and are not reintroduced here. Device configuration 1202(2) is organized into shared resources 1214, dedicated resources 1216, and an interface 1218 therebetween.

The controller 142 can be manifest as software that is stored on storage/memory 1210 and executed by the processor 1212. In other cases, the controller 142 may be a dedicated hardware or firmware controller, such as a microcontroller. The controller can receive information relating to a scenario, such as a virtual reality scenario, an augmented reality scenario, a mixed reality scenario, etc. The information can include information about the properties of virtual objects, such as the object's 6-degree of freedom (6-DOF) (e.g., x, y, z coordinates plus roll, pitch, and yaw) and/or other information such as various location, velocity, acceleration, mass, weight, dimensions and/or texture, among other information. The controller can also receive information about a user's body part, such as a finger, arm, or leg, among others. For instance, the controller could receive information about the user's hand from an outward facing camera on the headset 106. This information can include 6-DOF information (e.g., x, y, z coordinates plus roll, pitch, and yaw) and/or other information, such as, posture, velocity, acceleration, etc. The controller can also receive some of this information from the device 110 positioned on the user's forearm and hand. The controller can make predictions about interactions between the hand and the virtual objects based at least in part upon this information. The controller can then, based upon the predictions, control the engagement assembly directly, e.g., output devices on the engagement assembly, and/or indirectly by controlling the deployment assembly. In this way, the controller can cause the device 110 to cause user interaction with the virtual object to simulate interaction with an equivalent physical object.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 1202(2) can be thought of as a system on a chip (SOC) type design. In such a case, functionality provided by the device can be integrated on a single SOC or multiple coupled SOCs. One or more processors 1212 can be configured to coordinate with shared resources 1214, such as storage/memory 1210, etc., and/or one or more dedicated resources 1216, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, and/or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 13:
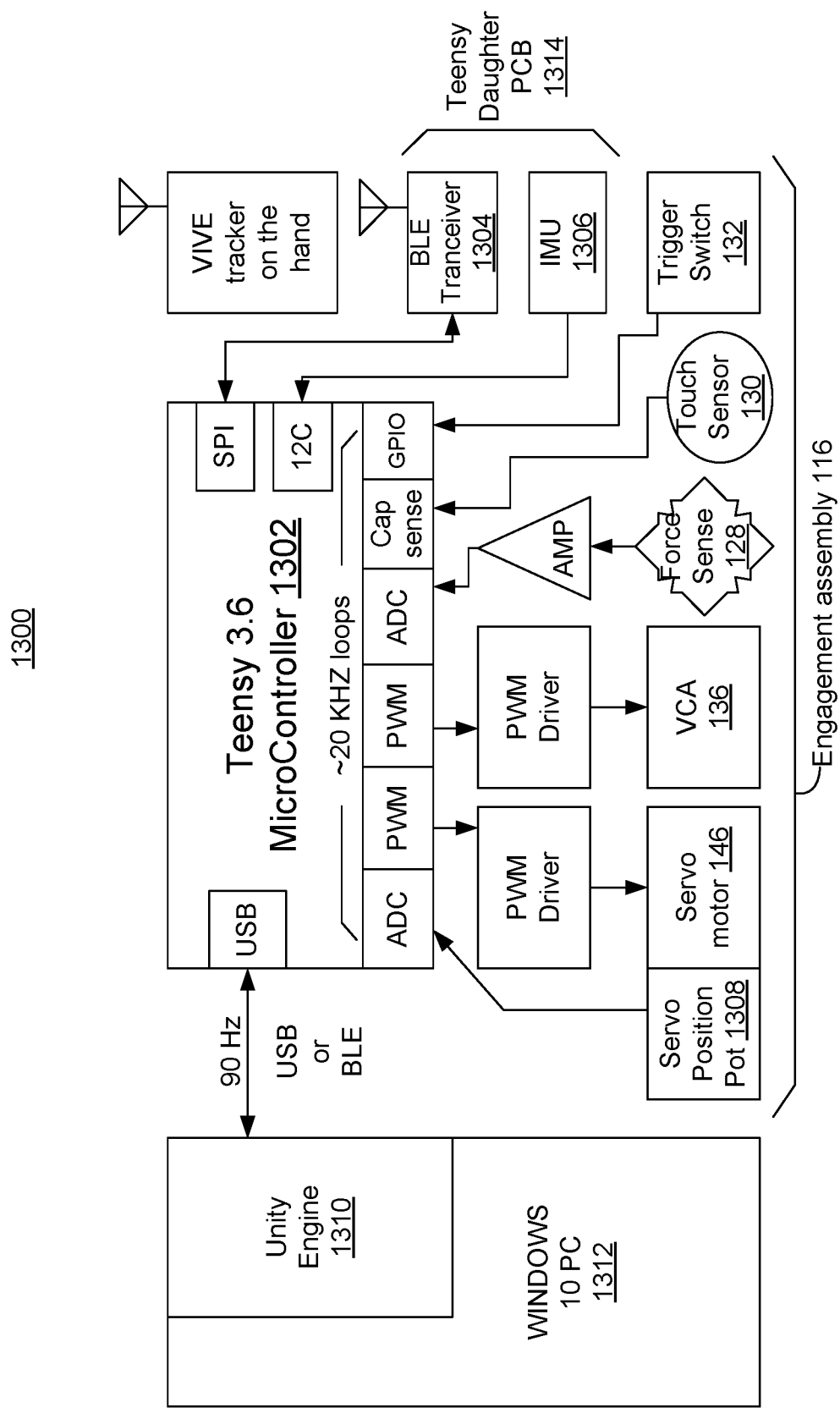
FIG. 13 shows a schematic diagram relating to an example deployable controller, consistent with some implementations of the present concepts.

FIG. 13 shows a schematic diagram 1300 that relates to the description above. The schematic diagram 1300 shows how the controller 142, which is manifested as a Teensy microcontroller 1302 can be communicatively coupled to other components. In this configuration, the microcontroller 1302 communicates with BLE transceiver 1304 and IMU 1306. The microcontroller 1302 communicates with switch 132 and touch sensor electrode 130, as well as receiving force data from strain gauge 128. The microcontroller 1302 can drive the VCA 136 and the servo motor 146 via pulse width modulation (PWM) drivers and can receive information about the servo motor position as indicated at 1308. The microcontroller 1302 can also interact with a unity game engine 1310 operating cooperatively with an operating system, such as Windows Brand operating system from Microsoft Corp. as indicated at 1312.

In this case the servo motor 146 is a modified version of a commercially available servo motor (Hitech HS-7115TH). The modification can provide control over: (1) torque and speed, (2) back-drivability, and (3) real-time position feedback. To achieve this functionality, the original control circuit can be removed and replaced with custom driver electronics and software running on the Teensy controller. The implemented PID loop can have time-based protection mechanisms to prevent overpowering the servo motor 146. Reading the absolute position of the potentiometer 1308, the frontend software is always up to date about the current position of the engagement assembly—even when the motor is turned off. This helps in making the right actions, for example to detect if the user is holding the engagement assembly or not. While a specific servo motor implementation is described here, other servo motor implementations are contemplated. For instance, stronger servo motors and/or servo motors having a quicker response time may be employed.

With this functionality, the device's engagement assembly can be controlled in a way that it gets to the user's hand with the right speed, exerts the right (scaled) force, and can be switched off anytime to enable passive rotation of the handle and prevent breakage.

The device's control board can be built around the Teensy 3.6 microcontroller 1302 that interfaces to a custom I/O daughterboard 1314. This daughterboard 1314 contains the servo motor driver and VCA PWM circuits, the inertial sensor (e.g., IMU 1306) to detect hand motions, the BLE chip (Nordic nrf52832) 1304 for wireless communication, and operational amplifiers to process the analog strain gauge full bridge output and the position from the servo's potentiometer encoder. The device can utilize the microcontroller's inbuilt capacitive sensing functionality to sense the conductive coating capacitance (e.g., touch sensor electrode 130) of the engagement assembly's inside electrodes in active loading mode to detect touch events. (See FIG. 1C). The engagement assembly 116 also contains VCA 136 to render vibrotactile feedback as well as trigger button (e.g., switch 132).

Some software implementations can employ a 2019 version of unity game engine 1310 as the software platform. The software can run on a tethered device, such as an Alienware 15 R3 laptop, equipped with a Vive Pro VR system. Unity game engine 1310 can maintain a representation of all the virtual objects in the interaction space every frame (90 Hz frames per second), as well as the location and orientation of the user's head and the location tracker attached to user's palm. A spherical 'trigger volume' can be defined around the device 110. Every virtual object that penetrates this volume is an object that might be touched, so the engagement assembly can be rotated to an angle closer to the palm. Once an object reaches the hand, commands can be transmitted to the microcontroller 1302 to rotate the engagement assembly accordingly, to simulate the haptic sensation of touch.

Other implementations of device 110 can be standalone units (e.g., fully untethered). Such implementations can employ either 6-DOF inside-out tracking or fully integrate a tracker that integrates a VIVE lighthouse system or the like.

Figure 14:
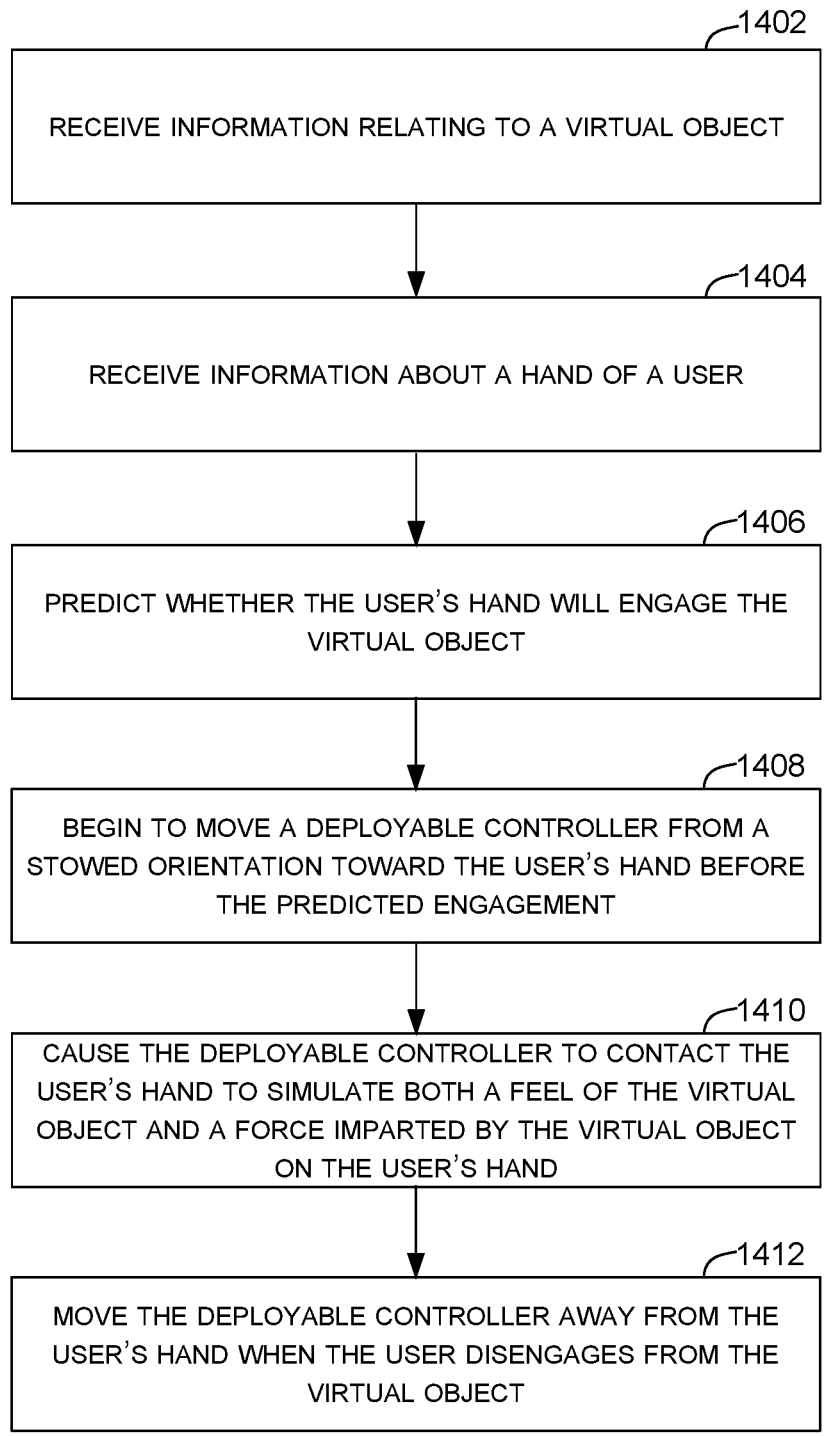
FIG. 14 shows a flowchart of an example controller deployment method, consistent with some implementations of the present concepts.

FIG. 14 shows a flowchart illustrating an example method 1400 relating to simulating an object. In act 1402, the method can receive information relating to a virtual object. The information can include a location, velocity, mass, texture, and/or dimensions, among other information of the virtual object.

In act 1404, the method can receive information about a hand of a user. The information can include a location, posture, and/or velocity, among other information of the user's hand.

In act 1406, the method can predict whether the user's hand will engage the virtual object. For instance, the prediction can involve predicting an engagement location where the hand and the virtual object will come together at a particular time.

In act 1408, the method can begin to move a deployable controller from a stowed orientation toward the user's hand before the predicted engagement.

In act 1410, the method can cause the deployable controller to contact the user's hand to simulate both a feel of the virtual object and a force imparted by the virtual object on the user's hand.

In act 1412, the method can move the deployable controller away from the user's hand when the user disengages (e.g., stops engaging) from the virtual object.

Thus, the method can provide a deployable controller that dynamically appears and vanishes in the user's palm, enabling fast switching between haptic feedback-supplemented interaction with virtual content and free-hand interactions with physical objects in the real world. This capability of fast switching makes the deployable controller especially suitable in AR scenarios, where users may frequently switch between virtual and physical tool use.

Various examples are described above. Additional examples are described below. One example includes a device comprising a base assembly configured to ground the device to a non-hand body part of a user, an engagement assembly 116 configured to receive tactile input from a hand of the user or to deliver tactile output to the hand of the user, and a deployment assembly 114 extending from the base assembly to the engagement assembly and configured to deploy the engagement assembly from a storage orientation proximate to the base assembly to a deployed orientation proximate to the hand of the user.

Another example can include any of the above and/or below examples where the base assembly is configured to be secured to the non-hand body part comprising a forearm of the user or an upper arm of the user.

Another example can include any of the above and/or below examples where the engagement assembly is configured to receive tactile input from the hand of the user and to deliver tactile output to the hand of the user.

Another example can include any of the above and/or below examples where the tactile output comprises imparting a force on the hand of the user.

Another example can include any of the above and/or below examples where the deployment assembly is configured to create the force from the non-hand body part to the hand.

Another example can include any of the above and/or below examples where the deployment assembly comprises a single axis powered hinge.

Another example can include any of the above and/or below examples where the deployment assembly comprises a multi-axis powered hinge.

Another example can include any of the above and/or below examples where the device further comprises sensors configured to detect a user deployment gesture.

Another example can include any of the above and/or below examples where the sensors are positioned in both the engagement assembly and the base assembly.

Another example can include any of the above and/or below examples where the user deployment gesture comprises a wrist-flip motion.

Another example can include any of the above and/or below examples where the device further comprises a controller 142, and wherein the controller is configured to utilize virtual reality data as input data for controlling the deployment assembly to deploy or store the engagement assembly.

Another example can include any of the above and/or below examples where the controller is configured to automatically cause the deployment assembly to deploy the engagement assembly at a rotational rate and time to engage the hand of the user to mimic the user catching a virtual object.

Another example can include any of the above and/or below examples where the controller is configured to automatically cause the deployment assembly to force the engagement assembly toward a palm of the hand of the user to mimic a velocity and force of the virtual object.

Another example can include any of the above and/or below examples where the controller is further configured to automatically cause the deployment assembly to move away from the user's hand when the user's hand stops engaging the virtual object.

Another example can include any of the above and/or below examples where the engagement assembly is removably secured to the deployment assembly and wherein the user can interchange between the engagement assembly and another engagement assembly.

Another example can include any of the above and/or below examples where the device further comprises a storage mechanism for either of the engagement assembly and the another engagement assembly that is not secured to the deployment assembly.

Another example includes a device comprising a base assembly configured to ground the device to a non-hand body part of a user, an engagement assembly configured to receive tactile input from a hand of the user or to deliver tactile output to the hand of the user, a deployment assembly extending from the base assembly to the engagement assembly and configured to deploy the engagement assembly from a storage orientation proximate to the base assembly to a deployed orientation proximate to the hand of the user, positional sensors configured to sense 3D location data of the device, and a controller configured to receive virtual 3D location data relating to a virtual object and to control the deployment assembly to cause deployment of the engagement assembly based at least in part upon the 3D location data of the device and the virtual 3D location data of the virtual object.

Another example can include any of the above and/or below examples where the positional sensors are 6-degree of freedom sensors configured to sense x, y, and z coordinates as well as roll, pitch, and yaw of the device.

Another example includes a device comprising a base assembly configured to ground the device to a forearm of a user, an engagement assembly configured to deliver tactile output as a force to a hand of the user, and a deployment assembly extending from the base assembly to the engagement assembly and configured to pivotally deploy the engagement assembly from a storage orientation proximate to the base assembly to a deployed orientation proximate to the hand of the user and to generate the force against the hand of the user.

Another example can include any of the above and/or below examples where the deployment assembly comprises a powered single axis hinge or a powered multi-axis hinge.

Another example can include any of the above and/or below examples where the deployment assembly is configured to deploy the engagement assembly along a path that approximates an arc or wherein the deployment assembly is configured to deploy the engagement assembly along a complex path.

Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

The invention claimed is:

1. A device, comprising:
   a base assembly configured to ground the device to a non-hand body part of a user;
   an engagement assembly configured to receive tactile input from a hand of the user or to deliver tactile output to the hand of the user; and,
   a deployment assembly extending from the base assembly to the engagement assembly and configured to deploy the engagement assembly from a storage orientation proximate to the base assembly to a deployed orientation proximate to the hand of the user.

2. The device of claim 1, wherein the base assembly is configured to be secured to the non-hand body part comprising a forearm of the user or an upper arm of the user.

3. The device of claim 1, wherein the engagement assembly is configured to receive tactile input from the hand of the user and to deliver tactile output to the hand of the user.

4. The device of claim 3, wherein the tactile output comprises imparting a force on the hand of the user.

5. The device of claim 4, wherein the deployment assembly is configured to create the force from the non-hand body part to the hand.

6. The device of claim 5, wherein the deployment assembly comprises a single axis powered hinge.

7. The device of claim 5, wherein the deployment assembly comprises a multi-axis powered hinge.

8. The device of claim 1, wherein the device further comprises sensors configured to detect a user deployment gesture.

9. The device of claim 8, wherein the sensors are positioned in both the engagement assembly and the base assembly.

10. The device of claim 8, wherein the user deployment gesture comprises a wrist-flip motion.

11. The device of claim 1, wherein the device further comprises a controller, and wherein the controller is configured to utilize virtual reality data as input data for controlling the deployment assembly to deploy or store the engagement assembly.

12. The device of claim 11, wherein the controller is configured to automatically cause the deployment assembly to deploy the engagement assembly at a rotational rate and time to engage the hand of the user to mimic the user catching a virtual object.

13. The device of claim 12, wherein the controller is configured to automatically cause the deployment assembly to force the engagement assembly toward a palm of the hand of the user to mimic a velocity and force of the virtual object.

14. The device of claim 12, wherein the controller is further configured to automatically cause the deployment assembly to move away from the user's hand when the user's hand stops engaging the virtual object.

15. The device of claim 1, wherein the engagement assembly is removably secured to the deployment assembly, and wherein the user can interchange between the engagement assembly and another engagement assembly.

16. The device of claim 15, further comprising a storage mechanism for either of the engagement assembly and the another engagement assembly that is not secured to the deployment assembly.

17. A device, comprising:
   a base assembly configured to ground the device to a non-hand body part of a user;
   an engagement assembly configured to receive tactile input from a hand of the user or to deliver tactile output to the hand of the user;
   a deployment assembly extending from the base assembly to the engagement assembly and configured to deploy the engagement assembly from a storage orientation proximate to the base assembly to a deployed orientation proximate to the hand of the user;
   positional sensors configured to sense 3D location data of the device; and,
   a controller configured to receive virtual 3D location data relating to a virtual object and to control the deployment assembly to cause deployment of the engagement assembly based at least in part upon the 3D location data of the device and the virtual 3D location data of the virtual object.

18. The device of claim 17, wherein the positional sensors are 6-degree of freedom sensors configured to sense x, y, and z coordinates as well as roll, pitch, and yaw of the device.

19. A device, comprising:
   a base assembly configured to ground the device to a forearm of a user;
   an engagement assembly configured to deliver tactile output as a force to a hand of the user; and,
   a deployment assembly extending from the base assembly to the engagement assembly and configured to pivotally deploy the engagement assembly from a storage orientation proximate to the base assembly to a deployed orientation proximate to the hand of the user and to generate the force against the hand of the user.

20. The device of claim 19, wherein the deployment assembly comprises a powered single axis hinge or a powered multi-axis hinge.

* * * * *